(12) United States Patent
Shaw et al.

(10) Patent No.: US 12,491,319 B2
(45) Date of Patent: Dec. 9, 2025

(54) UNIVERSAL DOSAGE VERIFICATION SYSTEM AND METHOD FOR MEDICAL SYRINGE

(71) Applicants: Retractable Technologies, Inc., Little Elm, TX (US); Thomas J. Shaw, Frisco, TX (US)

(72) Inventors: Thomas J. Shaw, Frisco, TX (US); Kathryn Duesman, Pilot Point, TX (US); Mark Small, Heavener, OK (US); Ni Zhu, McKinney, TX (US)

(73) Assignee: Retractable Technologies, Inc., Little Elm, TX (US)

( * ) Notice: Subject to any disclaimer, the term of this patent is extended or adjusted under 35 U.S.C. 154(b) by 0 days.

(21) Appl. No.: 18/427,210

(22) Filed: Jan. 30, 2024

(65) Prior Publication Data
US 2024/0165337 A1 May 23, 2024

Related U.S. Application Data

(63) Continuation-in-part of application No. 17/929,169, filed on Sep. 1, 2022.

(60) Provisional application No. 63/482,692, filed on Feb. 1, 2023.

(51) Int. Cl.
*A61M 5/315* (2006.01)
*A61M 5/31* (2006.01)

(52) U.S. Cl.
CPC .......... *A61M 5/315* (2013.01); *A61M 5/3129* (2013.01); *A61M 5/31533* (2013.01); *A61M 2005/3126* (2013.01); *A61M 2205/3379* (2013.01)

(58) Field of Classification Search
CPC ............... A61M 5/315; A61M 5/3129; A61M 5/31533; A61M 2005/3126; A61M 2205/3379
See application file for complete search history.

(56) References Cited

U.S. PATENT DOCUMENTS

| | | |
|---|---|---|
| 2,860,635 A | 11/1958 | Wilburn |
| 4,573,976 A | 3/1986 | Sampson |
| 4,650,468 A | 3/1987 | Jennings, Jr. |
| 4,702,738 A | 10/1987 | Spencer |
| 4,790,828 A | 12/1988 | Dombrowski |
| 4,840,619 A | 6/1989 | Hughes |

(Continued)

FOREIGN PATENT DOCUMENTS

| | | |
|---|---|---|
| CN | 102573959 | 7/2012 |
| CN | 104368068 | 2/2015 |

(Continued)

*Primary Examiner* — Dung T Ulsh
(74) *Attorney, Agent, or Firm* — Scheef & Stone, LLP; Robin L. Barnes; Mike Schofield

(57) ABSTRACT

Systems and methods of a dosage verification system are disclosed that can be used by a healthcare worker or an individual self-administering an injection to create a digital record verifying the dosage of a medicinal fluid drawn into a syringe prior to an injection. The dosage verification system includes a medical syringe and an imaging device configured to view and selectively capture, process, store, and transmit a digital image of the syringe from which the volumetric dose of medicinal fluid drawn into the fluid chamber of the barrel can be determined and/or verified prior to an injection.

11 Claims, 24 Drawing Sheets

(56) References Cited

U.S. PATENT DOCUMENTS

| | | | |
|---|---|---|---|
| D302,726 S | 8/1989 | Schwobel |
| 4,915,696 A | 4/1990 | Feimer |
| 4,946,447 A | 8/1990 | Hardcastle |
| 4,994,034 A | 2/1991 | Botich et al. |
| 5,037,402 A | 8/1991 | Bartman |
| 5,049,133 A | 9/1991 | Villen Pascual |
| 5,053,010 A | 10/1991 | McGary |
| 5,084,018 A | 1/1992 | Tsao |
| 5,092,461 A | 3/1992 | Adam |
| 5,215,534 A | 6/1993 | DeHarde |
| 5,312,372 A | 5/1994 | DeHarde |
| 5,407,436 A | 4/1995 | Toft |
| 5,445,618 A | 8/1995 | Adobbati |
| 5,456,668 A | 10/1995 | Ogle, II |
| D377,687 S | 1/1997 | Udovch |
| 5,672,161 A | 9/1997 | Allen et al. |
| 5,782,804 A | 7/1998 | McMahon |
| D420,129 S | 2/2000 | McMahon |
| 6,090,077 A | 7/2000 | Shaw |
| 6,213,987 B1 | 4/2001 | Hirsch |
| 6,290,678 B1 | 9/2001 | Aydelotte |
| 6,416,323 B1 | 7/2002 | Grenfell |
| 6,585,690 B1 | 7/2003 | Hoeck et al. |
| 7,115,113 B2 | 10/2006 | Evans |
| 8,372,044 B2 | 2/2013 | Westbye |
| 8,512,279 B2 | 8/2013 | Klein |
| D693,003 S | 11/2013 | Wang |
| 9,044,552 B2 | 6/2015 | Schraga |
| 9,173,726 B2 | 11/2015 | Sabourin |
| 9,308,353 B1 | 4/2016 | Shaw et al. |
| 9,320,469 B2 | 4/2016 | Shaw et al. |
| 9,381,309 B2 | 7/2016 | Shaw |
| 9,623,192 B2 | 4/2017 | Chin |
| D792,969 S | 7/2017 | Taylor |
| 9,814,841 B2 | 11/2017 | Shaw |
| D814,630 S | 4/2018 | Finke et al. |
| D815,732 S | 4/2018 | Mills et al. |
| 9,956,352 B2 | 5/2018 | Shaw et al. |
| D823,457 S | 7/2018 | Shaw et al. |
| D823,461 S | 7/2018 | Shaw et al. |
| D823,463 S | 7/2018 | Shaw et al. |
| D829,891 S | 10/2018 | Shaw et al. |
| 10,086,141 B2 | 10/2018 | Steel |
| D836,772 S | 12/2018 | Nandi |
| D838,842 S | 1/2019 | Shaw et al. |
| D851,757 S | 6/2019 | Nandi |
| 10,525,207 B2 | 1/2020 | Zivkovic et al. |
| 10,568,554 B2 | 2/2020 | Shaw et al. |
| 10,625,028 B2 | 4/2020 | Shaw et al. |
| D894,381 S | 8/2020 | Shaw et al. |
| D914,872 S | 3/2021 | Shaw et al. |
| 11,000,217 B2 | 5/2021 | Shaw et al. |
| 11,141,570 B2 | 10/2021 | Shaw et al. |
| 11,246,989 B1 | 2/2022 | Halbach |
| 2002/0065488 A1 | 5/2002 | Suzuki |
| 2002/0068907 A1 | 6/2002 | Dysarz |
| 2002/0082560 A1 | 6/2002 | Yang |
| 2003/0028171 A1 | 2/2003 | DeHarde |
| 2003/0229316 A1 | 12/2003 | Hwang |
| 2004/0024368 A1 | 2/2004 | Broselow |
| 2005/0020988 A1 | 1/2005 | Woehr |
| 2005/0159706 A1 | 7/2005 | Wilkinson |
| 2006/0084925 A1 | 4/2006 | Ramsahoye |
| 2006/0178578 A1 | 8/2006 | Tribble |
| 2006/0264825 A1* | 11/2006 | Westbye ............... A61M 5/326 604/110 |
| 2007/0276338 A1 | 11/2007 | Shue et al. |
| 2008/0114306 A1 | 5/2008 | Bare |
| 2012/0004621 A1 | 1/2012 | Shaw |
| 2012/0022464 A1 | 1/2012 | Zivkovic et al. |
| 2013/0023826 A1 | 1/2013 | Ishida |
| 2013/0204225 A1 | 8/2013 | Creaturo |
| 2014/0012206 A1 | 1/2014 | Shaw et al. |
| 2015/0073303 A1 | 3/2015 | Shaw |
| 2015/0196714 A1 | 7/2015 | Creaturo |
| 2015/0202373 A1 | 7/2015 | Creaturo |
| 2015/0231335 A1 | 8/2015 | Creaturo |
| 2016/0175537 A1 | 6/2016 | Thorne, Jr. et al. |
| 2017/0056603 A1 | 3/2017 | Cowan et al. |
| 2017/0312439 A1 | 11/2017 | Kelley |
| 2018/0154088 A1* | 6/2018 | Broselow .......... A61M 5/31566 |
| 2019/0282147 A1 | 9/2019 | Shaw |
| 2019/0298928 A1 | 10/2019 | Shaw et al. |
| 2019/0298929 A1 | 10/2019 | Shaw et al. |
| 2020/0206424 A1 | 7/2020 | Rios et al. |
| 2020/0324049 A1* | 10/2020 | Wilmot ................ A61M 5/20 |
| 2020/0381106 A1 | 12/2020 | Limaye et al. |
| 2020/0397660 A1 | 12/2020 | Hernandez et al. |
| 2022/0054764 A1 | 2/2022 | Shaw et al. |
| 2023/0034986 A1 | 2/2023 | Shaw et al. |
| 2023/0052321 A1 | 2/2023 | Shaw |
| 2023/0080728 A1* | 3/2023 | Caputo ................ G06Q 50/22 340/572.1 |
| 2023/0166047 A1 | 6/2023 | Yarger |
| 2024/0075216 A1 | 3/2024 | Shaw et al. |
| 2024/0165341 A1 | 5/2024 | Shaw |
| 2024/0226457 A1 | 7/2024 | Shaw et al. |
| 2024/0325649 A1 | 10/2024 | Shaw et al. |

FOREIGN PATENT DOCUMENTS

| | | |
|---|---|---|
| CN | 108619594 | 9/2018 |
| DE | 4323466 | 7/1993 |
| FR | 2809627 | 12/2001 |
| JP | 2016529078 | 9/2016 |
| WO | 2016176523 | 11/2016 |

\* cited by examiner

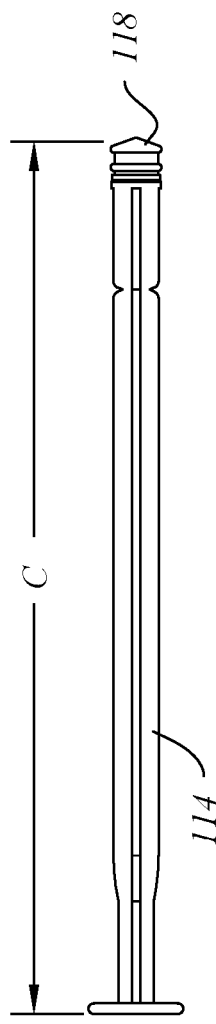
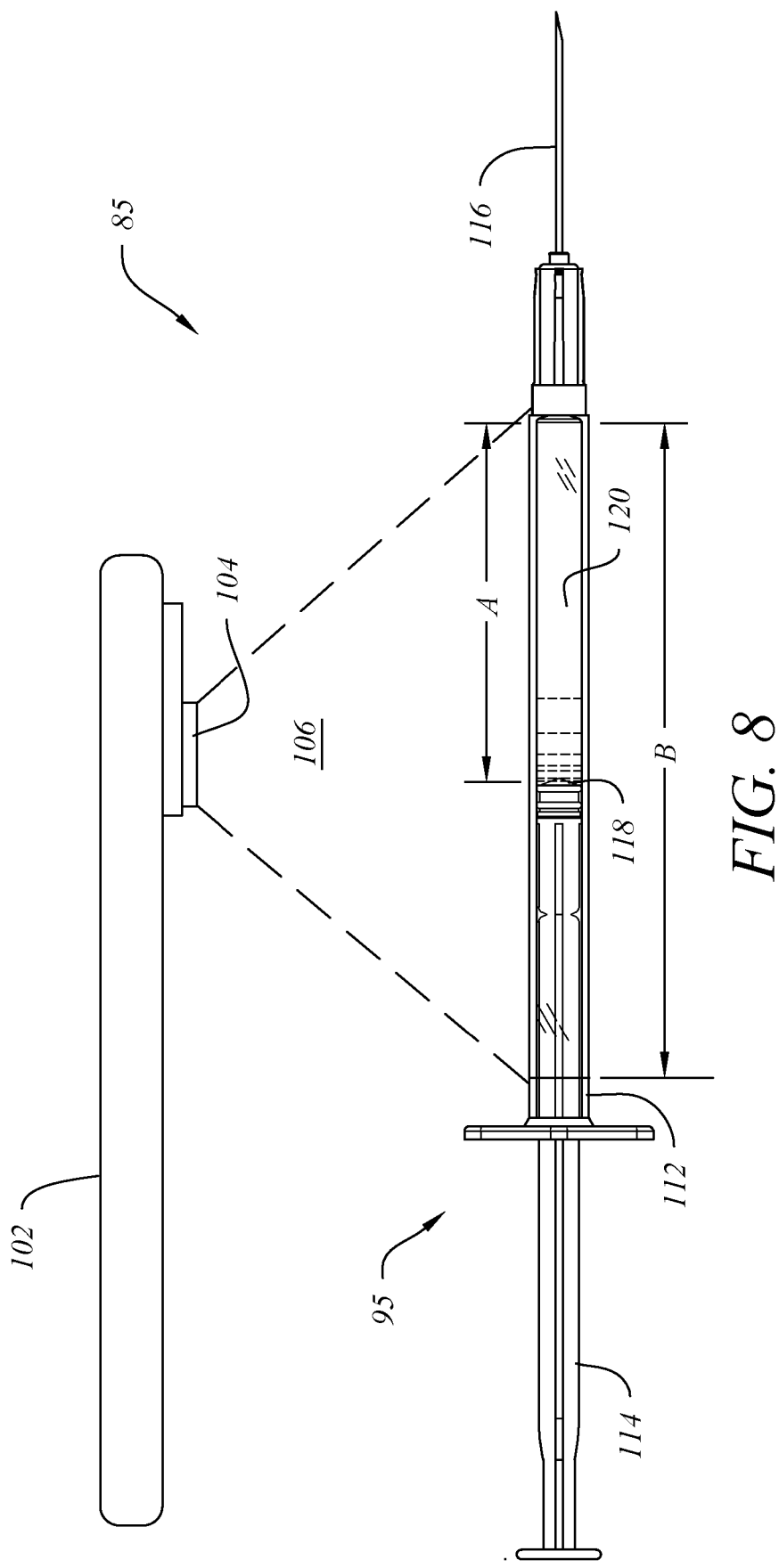

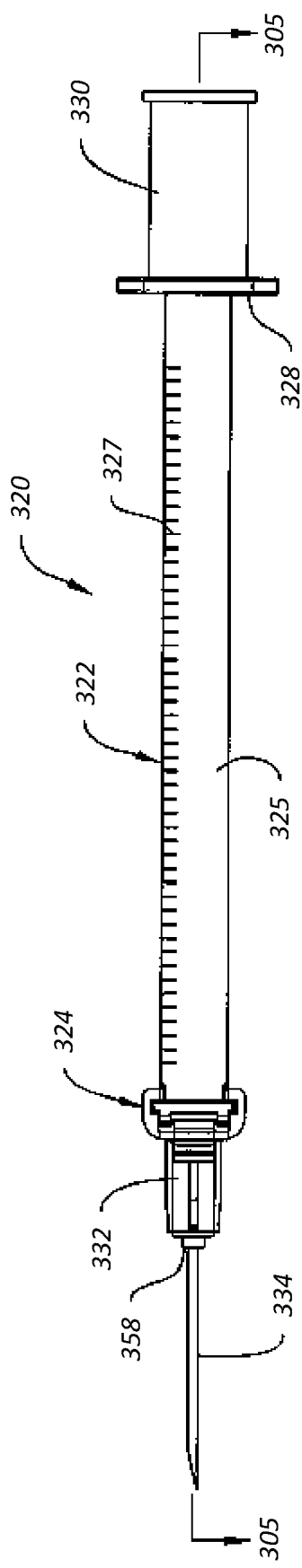
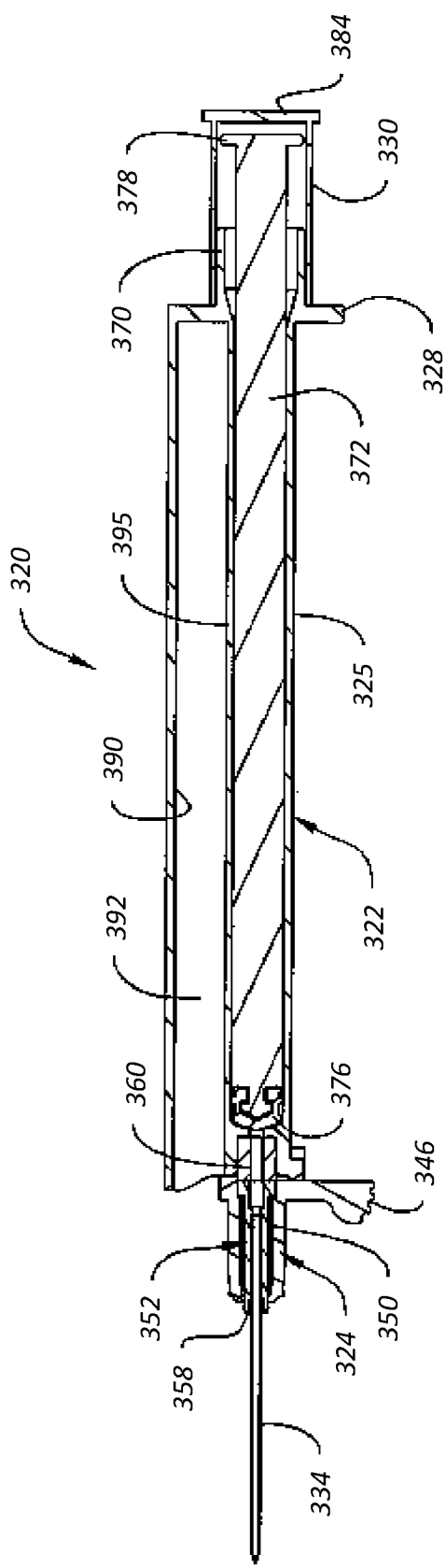
FIG. 14
FIG. 15

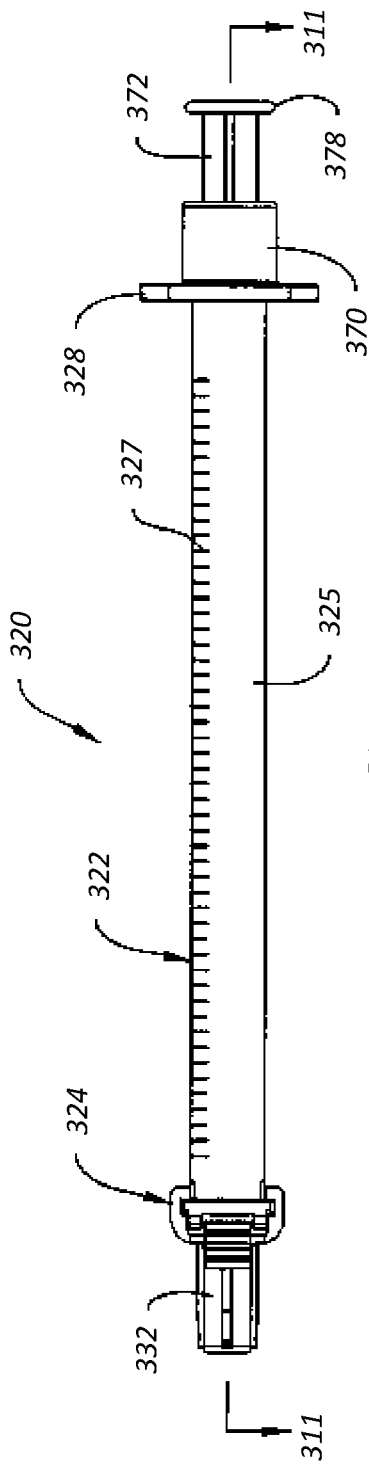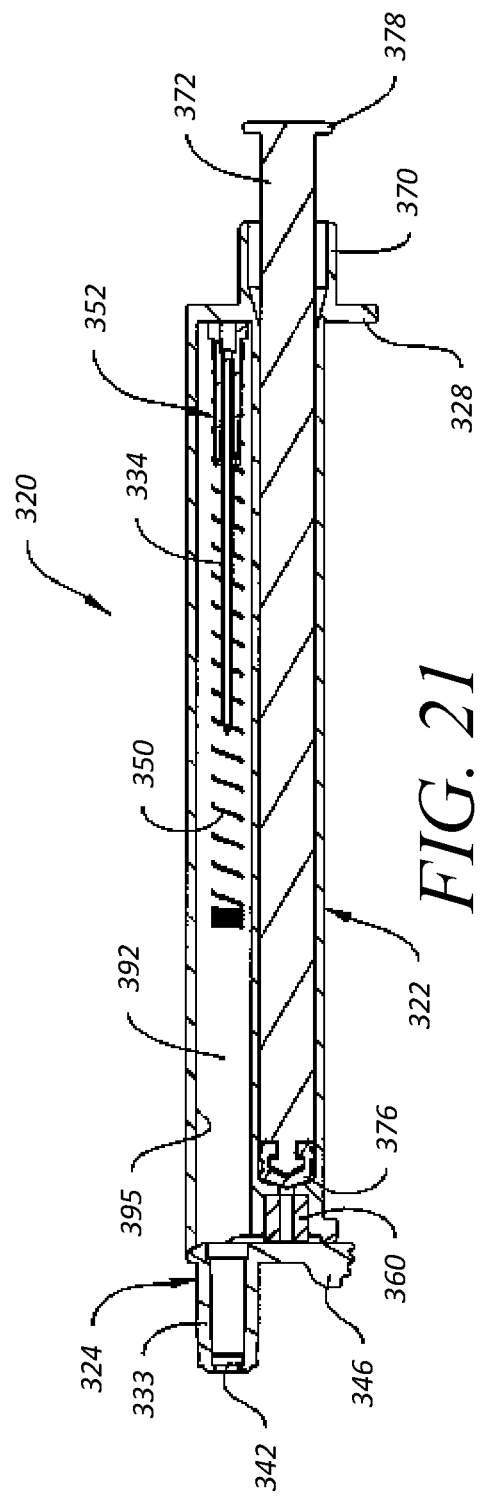

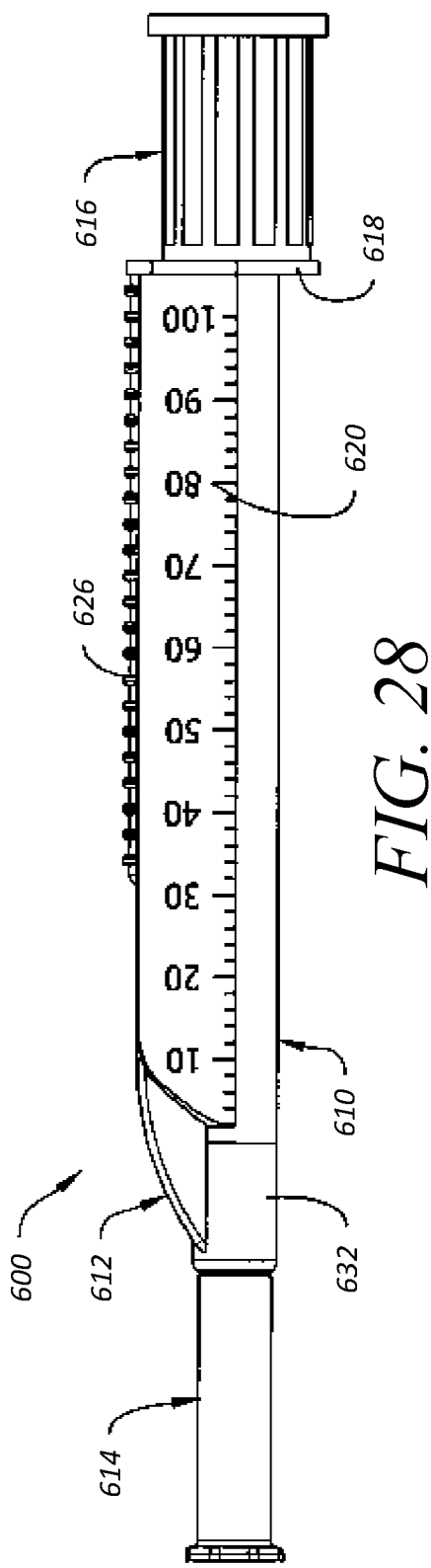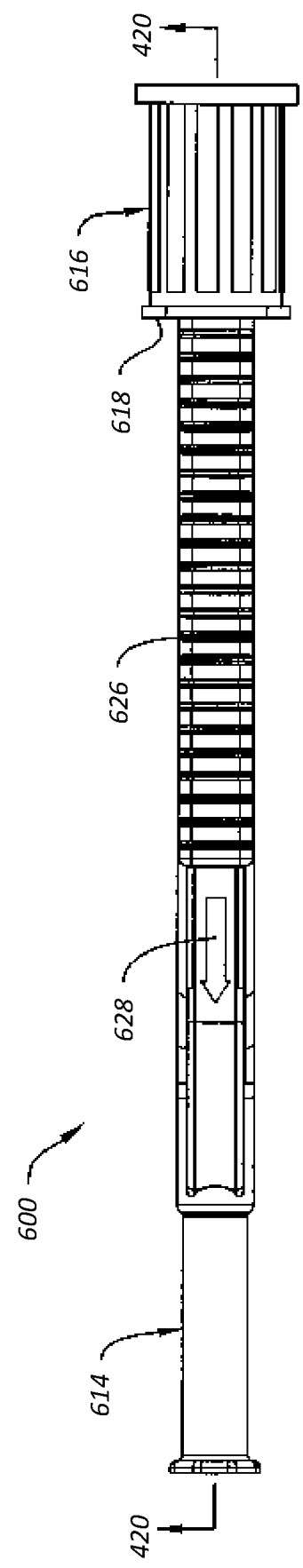

UNIVERSAL DOSAGE VERIFICATION SYSTEM AND METHOD FOR MEDICAL SYRINGE

CROSS-REFERENCE TO RELATED APPLICATIONS

This application is a continuation-in-part of U.S. application Ser. No. 17/929,169, filed Sep. 1, 2022, and also claims priority to U.S. Provisional Application No. 63/482,692, filed Feb. 1, 2023, the disclosures of which are incorporated by reference in their entireties for all purposes.

FIELD OF THE DISCLOSURE

This application relates to a system and method for quickly and reliably verifying, and providing a visual and a digital historical record of medicinal fluid doses drawn into a medical syringe or other patient fluid delivery device prior to administering the medicinal fluid to a patient.

BACKGROUND

The Joint Commission, a United States-based nonprofit organization that accredits more than 22,000 U.S. health care organizations and programs, has identified medication management as one of the top ten sentinel events. A "sentinel event" is an unexpected occurrence that results in death, permanent harm, severe temporary harm, or intervention to a patient. Ways to identify and reduce the occurrence of medical errors are a primary concern in the healthcare and insurance industries. A medical error is a preventable adverse effect of medical care, whether or not it is evident or harmful to the patient. Medication errors are a commonly occurring cause of medical errors, and can include administering the wrong drug, or administering the wrong dosage of the right drug, to a patient.

Dosing errors can arise from mistakes in calculating the recommended dosage based upon factors such a patient age, patient weight, blood glucose level, etc., or from mistakes in reading the drawn dosage on a volumetric scale of a medical syringe. Because the desired dosage of a medicinal fluid such as insulin may be dependent upon factors such as the real-time blood glucose level of a patient just prior to an injection, the use of factory-preloaded auto-injectors to avoid dosing errors is not always practicable. For smaller volume syringes, such as 1.0 mL and 0.5 mL, the barrel curvature associated with the small diameter of a conventional cylindrical syringe barrel makes the associated markings of the volumetric scale and related numerical indicia difficult to print and difficult to read. In some cases, the volumetric scale markings and the associated numerical indicia may wrap around the syringe barrel sufficiently that a user cannot accurately see and read both at the same time. Accurately reading a drawn dose in such circumstances can be difficult or impossible for medical professionals, thereby further increasing the likelihood of dosing errors when administering injections. Such likelihood of errors is further compounded with patients or non-professional caregivers drawing up their own doses for injection or other administration.

Various protocols have been instituted in an effort to reduce such medical errors, but such errors remain a principal concern. In many healthcare facilities, a medical caregiver must have another person visually verify the medicine and the drawn dosage prior to administering an injection to a patient. Such a requirement can pose an additional burden on staffing of clinics or hospitals, and particularly so during staffing shortages like those experienced during the Covid pandemic.

SUMMARY

The universal dosage verification system and method as disclosed here are believed to reduce the likelihood of medical errors attributable to drawing an incorrect dose of a medicinal fluid into a medical syringe or other needle-based patient fluid delivery device prior to injection or administration. Use of the subject disclosure may also avoid the need for having one person draw the dosage and another person present to verify the drawn dosage. The subject disclosure is adaptable for use with medical syringes of various sizes, shapes, and cross-sectional configurations, and with syringes having a known volumetric capacity but having barrel walls that are opaque or that otherwise lack clearly readable volumetric scales or numerical indicia.

According to one preferred embodiment, a system and method selectively capture a digital image of a syringe containing a single dose of a medicinal fluid before administering an injection and perform at least one process to determine a volume of medicinal fluid in the syringe based on the digital image. A single dose as used herein generally refers to a dose a medicinal fluid drawn into the syringe shortly before injection but may also include pre-filled syringes for which it is desirable to verify a volume of pre-filled medicinal fluid for accuracy. In some embodiments, a process to determine a volume of medicinal fluid comprises comparing a position of a plunger of the syringe with the drawn volume of medicinal fluid to known volumes associated with known positions of the plunger. In some embodiments, known positions of the plunger include a fully extended position relative to the barrel (a substantially full volume position) and a fully inserted position relative to the barrel (a substantially empty volume position). In other embodiments, a process to determine a volume of medicinal fluid comprises comparing a position of a plunger to volumetric markings or a volumetric scale on a barrel. Various other processes may also be used in other embodiments as further described herein.

According to another preferred embodiment, a digital image of a syringe containing a single dose of a medicinal fluid before administering an injection may be stored and can be recalled or accessed at any future time for physician or administrative review or to subsequently re-verify (or confirm the original verification of) the dosage drawn for a particular injection if a need arises for such corroboration. In still other embodiments, a digital image of a syringe containing a single dose of a medicinal fluid can be linked to a digital processor that can be used to generate reports, upload image data into a database, and communicate online with other medical providers, records, or networks.

In other embodiments, a dosage verification system comprises a camera, scanner or other digital imaging device configured to capture, record, store (at least temporarily, but optionally long term storage) and optionally transmit a digital image of a syringe containing a dose of a medicinal fluid for the purpose of establishing an accurate and reliable historical record of the dosage drawn into the syringe or the pre-filled syringe dosage prior to administration of the medicinal fluid by injection or infusion. In one embodiment, a dosage verification system can be programmed with application software downloadable to and installed on a cell phone equipped with at least one camera lens and associated programming to assess image sharpness and determine when the image is sufficiently focused to provide a reliable digital record confirming the dosage.

In other embodiments, a dosage verification system and method can be further enabled by the provision of appropriate lens(es), software and ancillary components, and circuitry to focus, capture, store, index, retrieve, cross-check, analyze and/or transmit digital data and images to provide an accurate historical record of the volume of a medicinal fluid in a medical syringe prior to an injection or infusion in addition to the date and time the dosage was drawn. If needed, a plurality of digital images of the same medical syringe containing the same dosage can be captured and analyzed iteratively to determine whether a statistically valid and reliable record (within appropriate standard deviations, confidence levels, or other error-checking protocols) has been achieved for the purpose of corroborating the dosage in the syringe. Optional data analysis features can include cross-matching against medicine records including typical doses for a given time of day, medical histories, insurance reporting, and billing.

In one embodiment, drawn dosage volumes of medicinal fluids are determined by direct imaging of a fluid level and/or a portion of a plunger in relation to a clearly visible volumetric scale, preferably with numerical indicia or volumetric markings, printed directly a syringe having the drawn dosage.

In another embodiment, drawn dosage levels of a medicinal fluid disposed inside a fluid chamber of a syringe barrel of known volumetric capacity with an opaque or otherwise non-transparent barrel wall or without clearly visible volumetric scale markings and numerical indicia may be determined by imaging a plunger handle position relative to the barrel with the dosage in the fluid chamber and then calculating (such as by ratio and proportion) the apparent volume of the drawn dosage based on known data about a plunger position and/or the syringe configuration when the fluid chamber is full or a plunger position when the fluid chamber is empty. In such an embodiment, only a single digital image of the syringe with the drawn dosage in the fluid chamber is needed. In still another embodiment, drawn dosage levels may be similarly determined by capturing at least two images of the syringe: (1) one imaging a plunger handle position relative to the barrel with the dosage in the fluid chamber and (2) a second imaging a plunger handle position relative to the barrel either before the dosage is drawn or after the dosage is injected. In some embodiments, only a portion of the plunger handle may be visible to the imaging device, which may be the portion within the barrel of the syringe, or the portion extending from the barrel of the syringe. Further, in other embodiments, only the plunger seal of the plunger handle may be visible to the imaging device to verify the dosage.

In another embodiment, index markings can be provided on the outwardly facing surface of a syringe barrel for use in defining the positions of a plunger handle and plunger seal relative to a barrel when (i) the plunger is fully inserted into the barrel (zero dose or empty), and when (ii) a maximum dose (the rated volumetric capacity of the syringe) is drawn into the fluid chamber inside the barrel (and the plunger is fully extended outside of the barrel). In such an embodiment, a digital imaging device of a dosage verification system is configured to image the index marking(s) for use in determining the plunger handle and/or plunger seal positions relative to the barrel and the associated dosage of medicinal fluid drawn into the syringe prior to an injection.

In another embodiment, for syringes where a rated volume (e.g., 1 mL, 0.5 mL, etc.) of the syringe is known but the fluid level of the dosage drawn into the fluid chamber of the barrel is not visible due to other factors, a dosage verification system and method can be configured to determine the drawn dosage by ratio and proportion by imaging (and measuring) the position of a plunger relative to a barrel for the drawn dosage and comparing it to the position of the plunger when the fluid chamber is either empty or full.

In another embodiment, a dosage verification system is disclosed that comprises a camera, scanner, or other digital imaging device in combination with a specially configured syringe having a flat (or substantially flat) display surface. A flat display surface enables the camera, scanner, or other digital imaging device (e.g., a cellular phone having camera functionality) to clearly view and capture an image of a dosage drawn into the syringe and a position of a plunger relative to one or more other components of the syringe. In still another preferred embodiment, a volumetric dosage scale or numerical volume indicia are disposed on a flat (or substantially flat) display surface of the specially configured syringe. In this embodiment, a camera, scanner, or other digital imaging device can clearly view and capture an image of a full volumetric dosage scale of the syringe, a position of a plunger relative to one or more other components of the syringe, and a medicinal fluid drawn into the syringe prior to administering an injection or infusion.

In another embodiment, the medicinal fluid level drawn into the fluid chamber of a syringe barrel is determinable from a single viewing position through a single wall of a barrel and from individual markings and/or numeric values on the syringe that indicate incremental (volumetric) liquid levels inside the barrel of the syringe. Markings and/or numerical values associated with the volumetric scale may be printed (e.g., pad printed) or molded onto the outer surface of the syringe.

In still other embodiments, a dosage verification system is optionally linked to a database of acceptable dosages for a particular medicinal fluid and patient profile, and digital images or scans of a syringe with a drawn dose are stored in the dosage verification system. In another embodiment, such digital images may also be uploaded, preferably automatically, into digitized patient records accessible with appropriate safeguards to various classes of identified user groups. Such user groups can include, for example, physicians, nurses, hospital administrators, pharmacy managers, caregivers, and risk and insurance managers. The digitized patient records including the uploaded digital images may also be selectively accessed by the patient via an application loaded on a mobile device (e.g., cell phone or tablet) or through a healthcare provider website.

In some embodiments, a dosage verification system and method may be used with any type of syringe or medicinal fluid injection device, without requiring any specialized syringe or injection device.

In still other embodiments, a dosage verification system and method may be used with any of various embodiments of a syringe for digital verification of a volume of medicinal fluid herein, which are specialized syringes and injection devices having various features that aid in facilitating digital dosage verification as described herein. For example, in one embodiment, a syringe for digital verification for use with dosage verification systems and methods herein comprises a needle retraction mechanism. A needle retraction mechanism may comprise a laterally offset needle retraction cavity that is substantially coextensive with a length of a fluid chamber of a barrel of a syringe. The needle may be selectively retracted following an injection by sliding movement of a component of the syringe to change the needle from being substantially aligned with the barrel to being substantially aligned with the needle retraction cavity, allowing a spring to push the needle rearwardly into the needle retraction cavity such that a sharp forward end of the needle is shielded within the needle retraction cavity or by another component of the syringe. Preferably, a needle retraction cavity has substantially the same length as the barrel to allow use with longer needles, which broadens the range of uses and procedures that are performable with the syringe without increasing the overall length of the syringe. Depending upon needle length, such uses and procedures can include, for example, performing spinal taps, administering epidural anesthesia, aspirating cysts, and the like, as well as for administering intradermal, subcutaneous, or intramuscular injections.

In another embodiment, a syringe for digital verification for use with dosage verification systems and methods herein comprises a sliding needle safety device that is selectively positionable to allow a forward sharp end of a needle of the syringe to be exposed for injection and then covered after an injection is complete. A needle safety device according to one embodiment may comprise an activation handle and a needle tip shield connected to the activation handle. An activation handle is preferably substantially parallel to a barrel of the syringe and is slidable forwardly to position the needle tip shield over the forward end of the needle when an injection is complete. A needle tip shield is preferably configured to extend circumferentially around and be coaxially aligned with the needle. In one embodiment, a needle tip shield is connected to or unitarily molded together with an activation handle. A needle safety device according to these embodiments eliminates the need for having a needle retraction mechanism and a needle retraction cavity and does not require transverse sliding movement of the barrel relative to the needle to protect users from accidental needle sticks. Following use of this embodiment of the syringe, the needle tip shield is selectively advanced to protect the user from the forwardly projecting needle tip by applying manual pressure to a touch surface of the activation handle that is located rearwardly of the needle and needle tip shield. In one embodiment, an activation handle may slidably engage the syringe barrel and is forwardly slidable relative to the barrel from a first position, in which the needle tip is uncovered, to a second position in which the needle tip is surrounded and protected against inadvertent needle sticks by the needle tip shield.

In still another embodiment, a syringe for digital verification for use with dosage verification systems and methods herein comprises at least one laterally extending wall that extends at least partially along or adjacent to a barrel of the syringe lengthwise and comprises having an outer facing surface that is substantially flat. An outer surface may be used as a display surface to which indicia, such as dosage scales or numerical volumetric information can be applied using a conventional pad printing process (sometimes referred to as "tampography") is used to apply volumetric dosage indicia or other markings to the substantially flat display surface of the syringe or by embossing or molding. In one embodiment, a laterally extending wall extends from a barrel laterally to both sides of the barrel. In another embodiment, a laterally extending wall extends from a barrel laterally to only one side. In another embodiment, a laterally extending wall is unitarily molded with the barrel. In still another embodiment, a laterally extending wall or portion thereof forms a portion of a needle retraction cavity.

In still other embodiments, a syringe for digital verification for use with dosage verification systems and methods herein comprises two laterally extending walls, each having an outer facing surface that is substantially flat, and each extending at least partially along or adjacent to a barrel of the syringe lengthwise. In one embodiment, the two laterally extending walls are oppositely facing, laterally spaced apart from each other, and parallel. In one embodiment, both outer surfaces may have the same indicia or may have different indicia. An embodiment with two outer surfaces may be pad printed without having to rotate the barrel, even when printing on 1 mL, 0.5 mL, or smaller syringes. Having substantially flat outer display surfaces also facilitates the application of indicia to a syringe by other processes such as embossing and injection molding.

In still another embodiment with two laterally extending walls, the laterally extending walls or a portion thereof form a portion of a needle retraction cavity. In one embodiment, a first laterally extending wall forms an upper wall of a needle retraction cavity and a second laterally extending wall forms a lower wall of a needle retraction cavity. In still another embodiment, a third wall connects an outer end of the upper and lower walls to form part of the needle retraction cavity and a fourth inner wall comprises a portion of a sidewall of a barrel of the syringe. A needle retraction cavity may have a non-circular cross-section.

In another embodiment with two laterally extending walls, the two laterally extending walls form a recess configured to receive an activation handle of a needle safety device to allow the activation handle to slide forwardly relative to the laterally extending walls. In one embodiment, an inner surface on one or both walls comprises a stop surface that prevents subsequent rearward movement of the activation handle once it is slid forward so the user is protected against subsequent accidental exposure of the needle tip and associated needle stick injuries. In other embodiments, suitable rails, ramps, stop shoulders and detents or other similarly effective structures are provided as part of an activation handle and/or one or both laterally extending walls and/or a barrel so that the activation handle can be advanced smoothly and without substantial interference when desired, and will not accidentally retract or slide rearwardly afterward being moved forwardly to re-expose a sharp needle tip.

In still other embodiments, a syringe for digital verification for use with dosage verification systems and methods herein comprises at least one component that is colored different from at least one other component. In one embodiment a portion of a plunger, such as a plunger seal may be colored differently from other portions of a syringe to facilitate differentiation of components in a captured digital image. In another embodiment a portion of an activation handle on a needle safety device may be colored differently from other portions of a syringe. In still another embodiment, a needle tip shield in a needle safety device may be colored differently from other portions of a syringe. In still another embodiment, a needle tip shield and a portion of an activation handle in a needle safety device may be colored the same (such as orange) and that coloration is different from other portions of a syringe (such as a black or blue plunger seal, black or blue volumetric indicia (if included), and a translucent white for all other parts of the syringe).

In another embodiment, a dosage verification system and method is adaptable for use with medical syringes having at least one flat or substantially flat, outwardly facing indicia display surface overlying a fluid chamber inside a barrel. Such display surface may comprise a portion of a sidewall of a fluid chamber for the syringe that are integrally molded so that fluid in the fluid chamber is visible through a single wall, rather than through multiple layers of materials or multiple wall layers. In syringes where a fluid level of a drawn dosage is plainly visible through a single wall of the fluid chamber in relation to a volumetric scale printed on or molded into the display surface and overlying or adjacent to at least a portion of the fluid chamber, an imaging device may be configured to capture and record the drawn dosage in relation to the corresponding value on the volumetric scale.

In some aspects, systems and methods described herein relate to an apparatus for injecting a verified dosage of a medicinal fluid, the apparatus including: a syringe having a non-transparent barrel, a plunger handle with a plunger seal slidably engaging a fluid chamber inside the barrel, and a hypodermic needle; and an imaging device configured to view and selectively capture, process, store, and transmit at least one digital image of the syringe from which a volumetric dosage of the medicinal fluid drawn into the fluid chamber can be determined.

In some aspects, systems and methods described herein relate to a system for injecting a verified dosage of a medicinal fluid, the system including: means for injecting the medicinal fluid using a syringe having a non-transparent barrel, a fluid chamber disposed inside the barrel, a plunger slidably engaging the barrel, and a hypodermic needle; means for positioning a digital imaging device relative to the syringe; means for drawing a dosage of the medicinal fluid into the fluid chamber using the plunger; means for viewing and selectively capturing and storing at least one digital image of the syringe and the medicinal fluid drawn into the fluid chamber using the digital imaging device; and means for determining a volumetric dosage of the medicinal fluid by processing the digital image.

In some aspects, systems and methods described herein relate to a non-transitory computer-readable storage medium having embedded therein a set of instructions which, when executed by one or more processors of a computer, causes the computer to execute operations for verifying a dosage of a medicinal fluid drawn into a syringe, the operations including: providing a syringe having a non-transparent barrel, a fluid chamber disposed inside the barrel, a plunger slidably engaging the barrel, and a hypodermic needle; providing a digital imaging device configured to selectively view, capture, and store a digital image of the syringe containing a drawn dosage of the medicinal fluid; drawing a dosage of the medicinal fluid into the fluid chamber; positioning the digital imaging device relative to the syringe; capturing and storing the digital image of the syringe and the medicinal fluid drawn into the fluid chamber; and processing the digital image to determine the drawn dosage of medicinal fluid.

In some aspects, systems and methods described herein relate to a syringe for verification of a volume of a medicinal fluid drawn into the syringe, the syringe including: a barrel; a fluid chamber disposed inside the barrel and configured to receive the volume of the medicinal fluid drawn into the syringe; a plunger slidably engaging the fluid chamber; wherein a first portion of the syringe has a first element; wherein a second portion of the syringe has a second element; and wherein the first element and the second element are distinguishable by a processor from other portions of the syringe in a digital image of the syringe to determine a position of the plunger relative to the barrel that indicates the volume of the medicinal fluid drawn into the syringe.

In some aspects, systems and methods described herein relate to a system for verifying dosage accuracy of a medicinal fluid, the system including: a syringe including a barrel, a fluid chamber disposed inside the barrel, a plunger slidably engaging the fluid chamber, and a needle, the syringe configured to draw an actual dosage of the medicinal fluid into the fluid chamber by movement of the plunger rearwardly in the fluid chamber; and a first data set including pre-determined volumetric proportions of the fluid chamber between a substantially full volume when the plunger is in a fully extended position relative to the barrel and a substantially empty volume when the plunger is in a fully inserted position relative to the barrel, the first data set configured to be saved to a processor or accessed by the processor for use in a software application to determine a volume of the actual dosage based on a digital image of the syringe after the actual dosage is drawn into the fluid chamber and a position of the plunger relative to the barrel is between the fully extended position and the fully inserted position.

In some aspects, systems and methods described herein relate to a handheld imaging device for verifying dosage accuracy of a medicinal fluid, the handheld imaging device including: a camera configured to selectively capture at least one digital image of a syringe having a barrel, a plunger slidably engaging a fluid chamber inside the barrel, and an actual dosage of the medicinal fluid in the fluid chamber; a processor executing a software application configured to determine a volume of the actual dosage of the medicinal fluid based on the at least one digital image of the syringe, and provide at least one piece of information to a user regarding the volume of the actual dosage.

In some aspects, systems and methods described herein relate to a system for verifying dosage accuracy of a medicinal fluid, the system including: a syringe having a barrel, a plunger slidably engaging a fluid chamber inside the barrel, and a hypodermic needle, the syringe configured to draw an actual dosage of the medicinal fluid into the fluid chamber by movement of the plunger rearwardly in the fluid chamber; and an imaging device configured to selectively capture at least one digital image of the syringe and a processor executing a software application to determine a volume of the actual dosage of the medicinal fluid based on the at least one digital image of the syringe.

In one embodiment, a method for verifying a dose of a medicinal fluid drawn into a medical syringe, comprises: (1) providing a medical syringe having a barrel, a fluid chamber disposed inside the barrel, a plunger slidably engaging an inside wall of the barrel and a hypodermic needle projecting forwardly from the barrel; (2) providing a digital imaging device, and most preferably a dosage verification system, configured to capture a digital image of a dose of medicinal fluid drawn into the fluid chamber of the medical syringe; (3) drawing a dose of medicinal fluid into the fluid chamber of the medical syringe; (4) selectively positioning the digital imaging device relative to the medical syringe containing the drawn dose of medicinal fluid; (5) capturing a digital image of the medical syringe; and (6) processing the digital image to determine an actual volume of the dosage drawn. Although other digital imaging devices may be used in methods according to embodiments herein, most preferably a dosage verification system according to an embodiment herein is used with methods herein.

According to another embodiment, a method for verifying a dose of a medicinal fluid drawn into a medical syringe, further comprises: (7) storing the digital image to create a digital record of the drawn dose of medicinal fluid. According to still other embodiments, a method for verifying a dose of a medicinal fluid drawn into a medical syringe, further comprises one or more of: (8) recalling or retrieving from memory one or more digital images to visually re-verify or confirm an actual dosage as previously determined by a dosage verification system and method herein depicted for a syringe depicted in the one or more digital images; (9) transmitting data or information related to an actual dosage as determined by a dosage verification system and method herein to an external device, database, or person (such as a user's physician); (10) transmitting one or more of the digital images to an external device, database, or person (such as a user's physician); and/or (11) generating an alert when an actual dosage as determined by a dosage verification system and method herein is inaccurate based on comparison to a set of linked or stored data that may include a prescription, medical records, insurance information, a medical device reading (e.g., blood glucose level determined by a glucose monitor).

According to some embodiments, processing the digital image to determine the actual volume dosage drawn comprises: determining a position of the plunger (with the dose of medicinal fluid in the syringe) relative to another component of the syringe, such as the barrel, and utilizing pre-determined volumetric proportions of a fluid chamber between a substantially full volume when the plunger is in a fully extended position relative to the barrel and a substantially empty volume with the plunger is a fully inserted position relative to the barrel. This embodiment is particularly useful if the syringe does not include volumetric markings and/or the fluid chamber/barrel is not transparent.

In other embodiments, processing the digital image to determine the actual volume dosage drawn comprises: comparing a position of a plunger (with the dose of medicinal fluid in the syringe) to volumetric markings on the syringe (preferably on or adjacent to the barrel). In still another preferred embodiment, this comparison is coupled utilizing pre-determined volumetric proportions of a fluid chamber between a substantially full volume and a substantially empty volume based on plunger position indicated in the digital image.

Use of a dosage verification system and method herein may reduce the likelihood of medical errors attributable to drawing the wrong dose into a medical syringe prior to injection and will provide an accurate historical record in the form of digital images of doses drawn into the fluid chamber of a medical syringe and other stored data regarding the doses.

Other benefits and advantages of the subject medical devices will likewise become more apparent to those of ordinary skill in the art upon reading this disclosure in relation to the accompanying drawings.

BRIEF DESCRIPTION OF THE DRAWINGS

Systems and methods of the disclosure are further described and explained in relation to the following drawings wherein:

FIG. 7 is a longitudinal side elevation view of the plunger of the conventional medical syringe of FIG. 6;

FIG. 8 is a side elevation view of an embodiment of components of a dosage verification system showing a portable imaging device disposed in a use position relative to the conventional medical syringe of FIG. 6 with the plunger partially withdrawn as it would be after drawing a dose of medicinal fluid into the fluid chamber and adjusting the viewing field of the portable imaging device to include the full functional length of the fluid cylinder inside the barrel;

FIG. 14 is a right side elevation view of the embodiment of FIG. 12;

FIG. 15 is a cross-sectional view taken along line 305-305 of FIG. 14;

FIG. 20 is a right side elevation view of the embodiment of FIG. 18 with a needle retracted and with a plunger fully advanced inside the barrel;

FIG. 21 is a cross-sectional view taken along line 311-311 of FIG. 20;

FIG. 28 is a side elevation view of the syringe embodiment of FIG. 24;

FIG. 29 is a top plan view of the syringe embodiment of FIG. 24;

DETAILED DESCRIPTION

Dosage verification systems and methods herein are generally useful for determining an actual volume of a dosage of medicinal fluid, either drawn by a user just prior to use or pre-filled, in a medical syringe. For purposes of this disclosure, a medical syringe for use with systems and methods herein may be any type of syringe or injection device without any specialized features or structure (also referred to as a conventional syringe), such as syringe 95 (FIG. 6), or may be a specialized syringe according to an embodiment herein, such as syringe 11 (FIG. 1), syringe 320 (FIG. 11), or syringe 600 (FIG. 24), or having one or more features or structures of a specialized syringe embodiment herein.

Generally, a medical syringe, whether specialized or conventional, may comprise a barrel and a plunger with a plunger seal slidably engaging a generally cylindrical interior wall of the barrel to form an adjustable fluid chamber inside the barrel. A medical syringe may further comprise a hypodermic needle disposed in fluid communication with the fluid chamber and projecting forwardly from the distal (or front) end of the barrel, and generally having a longitudinal axis aligned with a longitudinal axis of the barrel prior to and during an injection. A barrel and plunger are typically made of moldable, medical grade plastic but in some embodiments other materials may be used, for example, a barrel may be made of glass. A barrel may also have volumetric markings to indicate an amount of a medicinal fluid drawn into a syringe.

Medical syringes for use with dosage verification systems and methods herein may include electronic components, but such electronic components are not required to facilitate determination of an actual dosage of medicinal fluid in a syringe with dosage verification systems and methods herein. Embodiments of specialized syringes disclosed herein for use with dosage verification systems and methods herein preferably do not include any electronic components.

Figure 1:
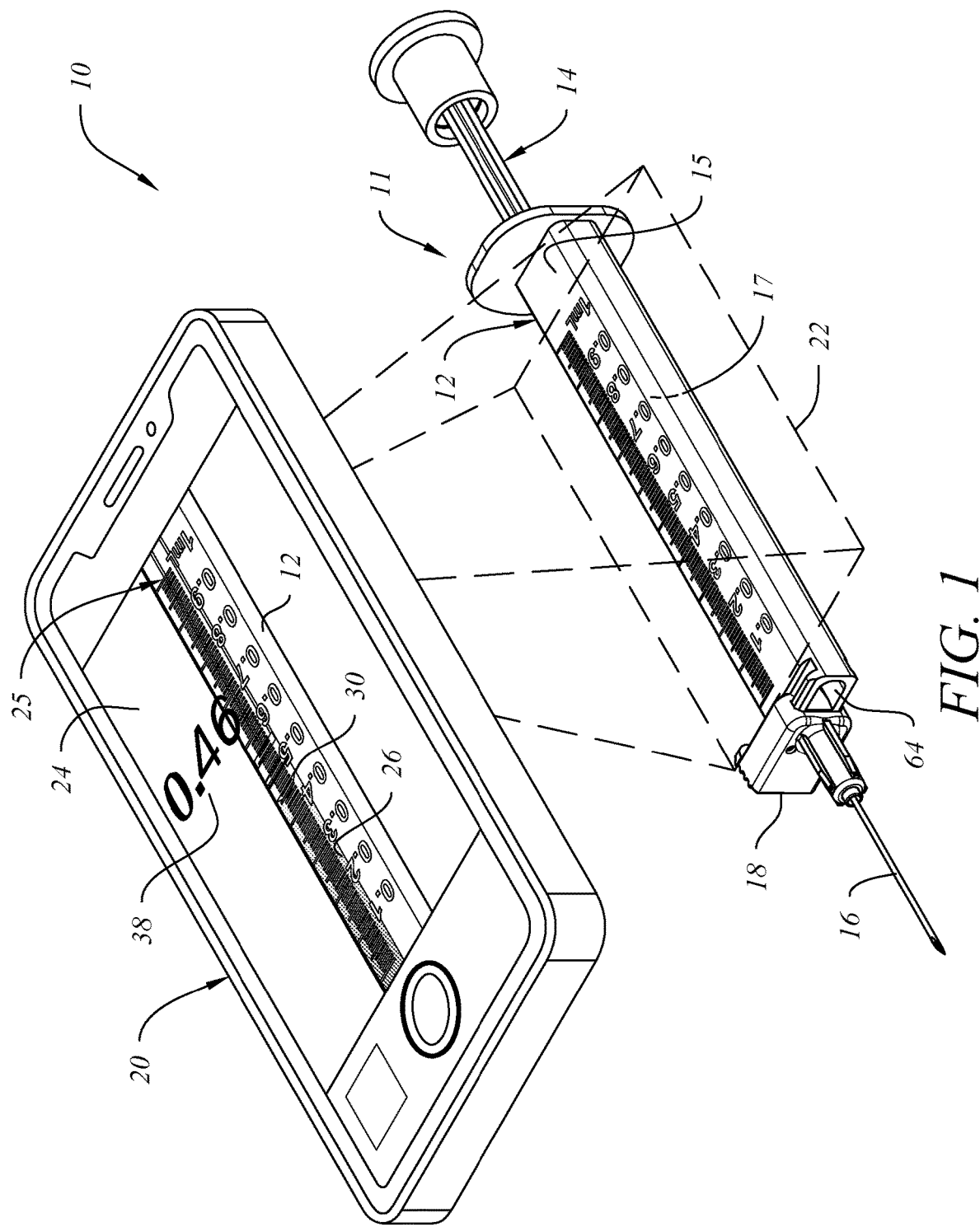
FIG. 1 is a top perspective view of an embodiment of components of a dosage verification system showing a cellular telephone having a digital imaging capability disposed in a use position above a medical syringe according to an embodiment herein, wherein the medical syringe has a barrel with a flat upwardly facing outer wall through which a dose of a medicinal fluid drawn into a tubular fluid chamber disposed inside the barrel is visible through the upwardly facing outer wall in relation to a volumetric scale and related numeric indicia disposed on the flat upwardly facing surface of the upwardly facing outer wall.
Figure 2:
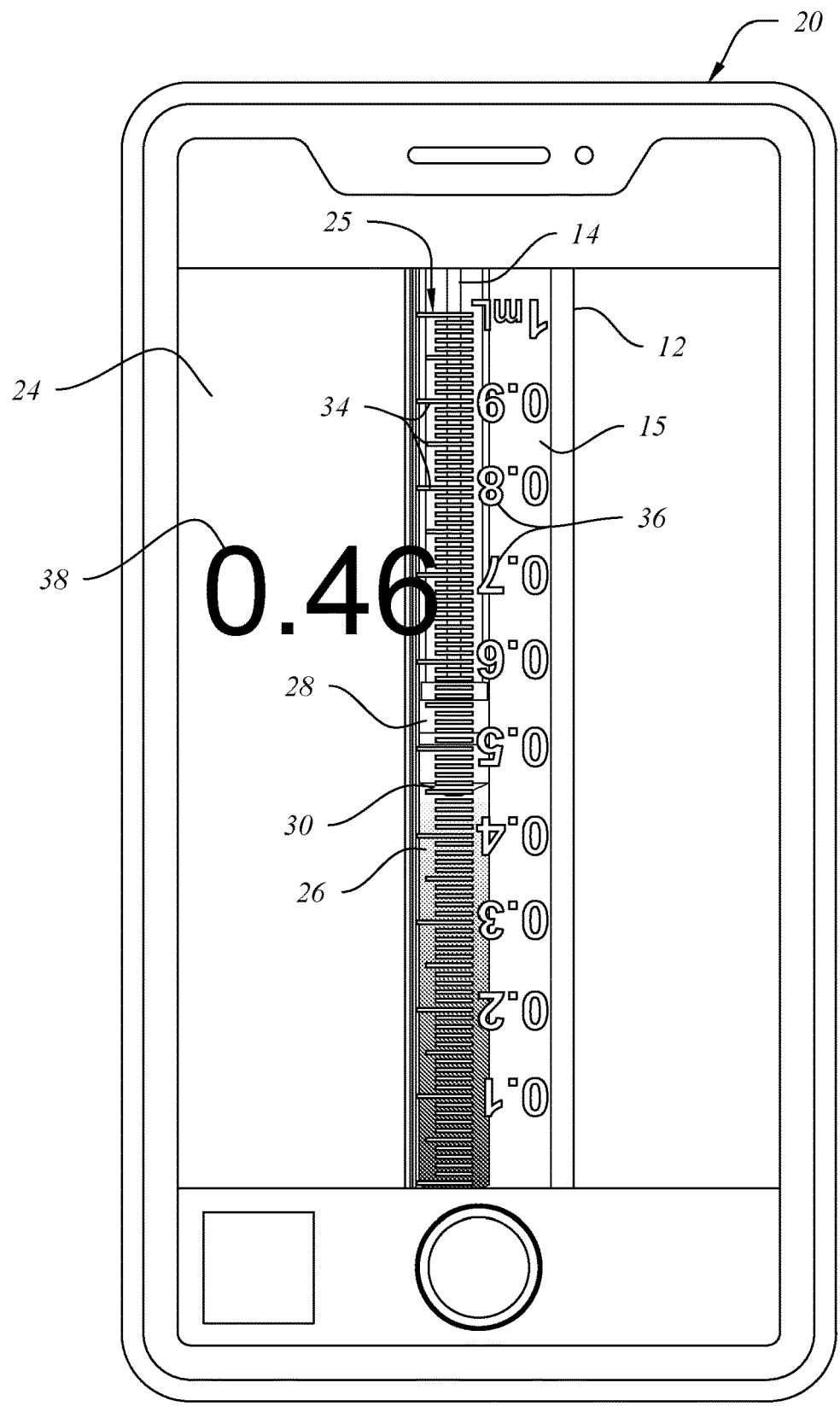
FIG. 2 is an enlarged top plan view of the cellular telephone of the dosage verification system of FIG. 1 with a digital image showing a portion of a volumetric scale and related numeric indicia disposed on the upwardly facing surface of the upwardly facing outer wall of the syringe barrel and overlying a portion of the fluid chamber through which a drawn dose of medicinal fluid is clearly visible and indicated by shading in the drawing.
Figure 5:
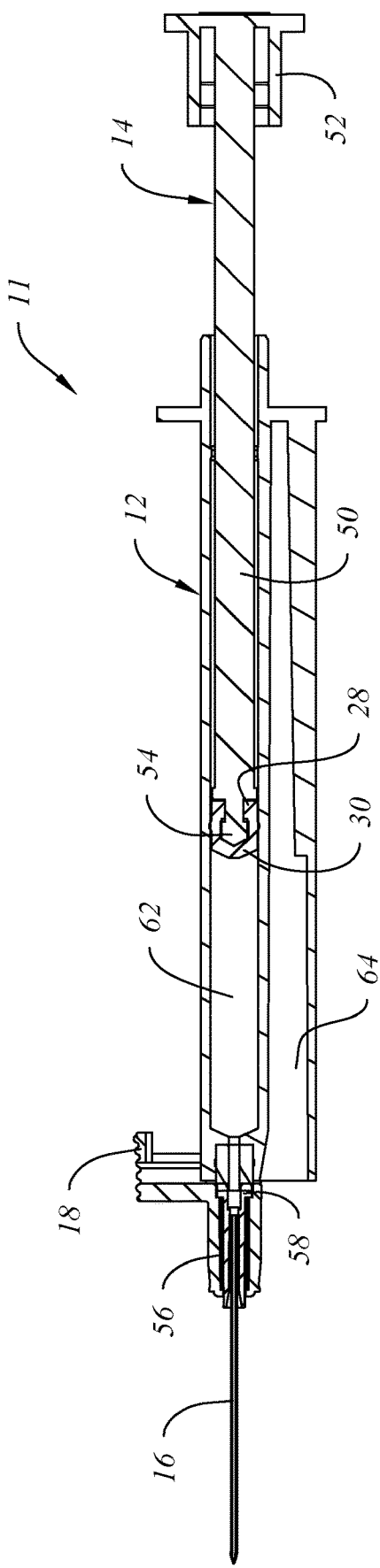
FIG. 5 is a cross-sectional plan view of the medical syringe of FIGS. 1 and 3 with a plunger partially inserted inside a barrel but without any drawn dose of medicinal fluid to better illustrate a fluid chamber inside the barrel.

Referring to FIGS. 1, 2, and 5, one embodiment of a dosage verification system 10 is shown. Dosage verification system 10 may comprise a mobile imaging device 20 configured to capture a digital image of a medical syringe or at least a portion of a medical syringe, such as syringe 11. Mobile imaging device 20 may be part of a cell phone, tablet, or small laptop. Mobile imaging device 20 may comprise a camera system configured to capture a digital image of at least a portion of a medical syringe having a volume of an actual dosage of medicinal fluid, either drawn just prior to use or pre-filled, a processor configured to process the captured digital image to determine the volume of the actual dosage of medicinal fluid in the medical syringe (referred to herein as an "actual volume" or "actual dosage" or "actual dose"), and storage/memory capabilities to optionally store captured digital images, application software, and other data used in processing captured digital images to determine an actual volume of the medicinal fluid. In some embodiments, processor and application software are preferably further configured to alert a user if the actual volume determined does not correspond to an intended dosage based on various data (such as a prescription or blood glucose reading). In some embodiments, an alert may be visual, audible, tactile, or any combination thereof.

Mobile imaging device 20 may comprise a display screen or display window 24 that displays an image of object (e.g., syringe 11) within a viewing field 22 of a camera lens of mobile imaging device 20. It will be appreciated that the dimensions of viewing field 22 can vary in accordance with the spacing between syringe 11 and mobile imaging device 20 and with the configuration, lenses, focal lengths, and operational mode of mobile imaging device 20. In the preferred embodiment shown in FIG. 1, viewing field 22 covers a full length of the volumetric scale 25. However, it will be appreciated that mobile imaging device 20 and the associated capture software may capture an image of syringe 11 and correctly assess and/or verify the dosage when the entire syringe 11 is not within the field of view.

Mobile imaging device 20 is preferably configured to be hand-held by a user to capture a digital image of a syringe. Although mobile imaging device 20 may be part of a wearable device, such as a mounted on a headband, eyeglasses, a lanyard/necklace, or wrist bracelet/watch, that allows mobile imaging device 20 to capture a digital image while being worn by a user, mobile imaging device 20 is most preferably not part of a wearable device that is attached to or supported by any portion of a user's body other than a hand/hands during use. Mobile imaging device 20 may be carried by a user in an item of clothing, such as a pocket, without being part of a wearable device as it would be removed and hand-held during use. Accordingly, in some embodiments, mobile imaging device 20 may be a cell phone, tablet, or small laptop and be configured to be portable. In this manner, mobile imaging device 20, and consequently dosage verification system 10, may be used in various locations and is not restricted to any particular location.

As shown in FIG. 1, a preferred embodiment of a syringe 11 comprises a wall extending laterally from barrel 12 and having an outwardly facing indicia display surface 15. Indicia display surface 15 is substantially flat and allows an array of volumetric markings or a volumetric scale 25 corresponding to a volume in a fluid chamber of the syringe 11 to be printed, embossed, or molded thereon. In one preferred embodiment of syringe 11, barrel 12 is unitarily molded from a transparent or translucent medical grade polymer and comprises volumetric scale 25 having incremental markings 34 and accompanying numerical indicia 36 printed, embossed, or molded onto the flat, outwardly facing indicia display surface 15 (with an oppositely facing flat display surface 17 shown without markings or indicia in FIG. 1). Incremental markings 34 and accompanying numerical indicia 36 overlie and facilitate simultaneous viewing of a dosage of a medicinal fluid 26 inside the longitudinally extending, cylindrical fluid chamber 62 (visible in FIG. 5) of barrel 12 that is bounded rearwardly by a forwardly facing surface 30 of a plunger seal 28 mounted on a forwardly extending projection 54 of plunger handle 50 of plunger 14.

Figure 3:
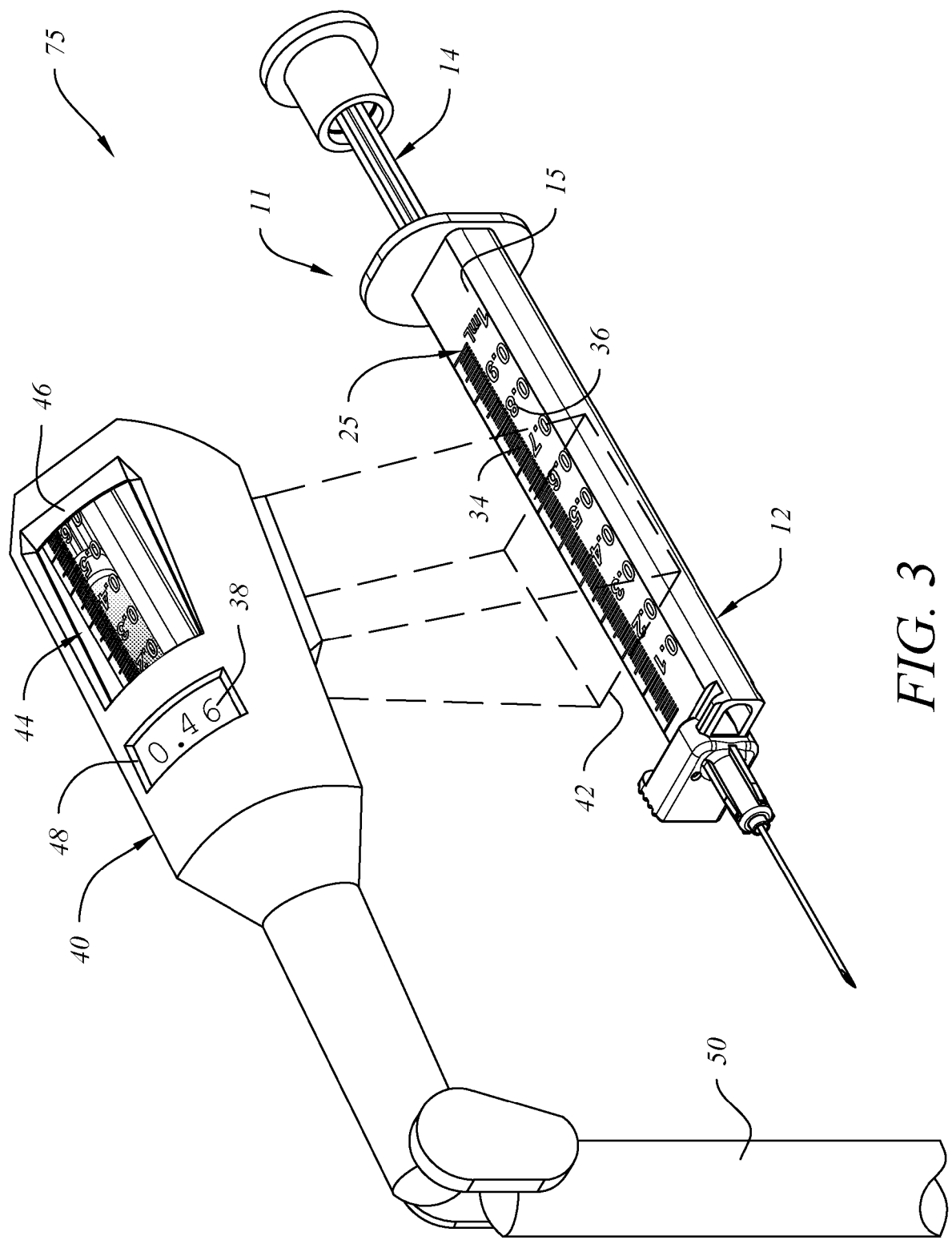
FIG. 3 is a top perspective view of another embodiment of components of a dosage verification system showing an adjustably mounted digital imaging device disposed in a use position above a medical syringe according to an embodiment herein, wherein the medical syringe has a barrel with a flat upwardly facing outer wall forming an upwardly facing indicia display surface bearing a volumetric scale and related numeric indicia, through which a dose of medicinal fluid drawn into a tubular fluid chamber of the syringe barrel is visible.

Barrel 12 further comprises a forwardly projecting hypodermic needle 16 that is coaxially aligned with longitudinally extending, cylindrical fluid chamber 62. As shown in FIGS. 1, 3, and 5, hypodermic needle 16 is rearwardly biased inside a transversely slidable frontal attachment 18 prior to an injection. It should be appreciated, however, that the present disclosure for dosage verification systems and methods herein is not limited to use with medical syringes having retracting or retractable needles and related mechanisms, and is similarly useful with medical syringes having, for example, fixed or attachable needles and with or without other needle safety features.

Cylindrical fluid chamber 62 is bounded by an inwardly facing tubular wall portion of barrel 12 that is unitarily molded with outwardly facing, flat indicia display surfaces 15, 17. Barrel 12 is sufficiently transmissive to light that forwardly extending end 30 of plunger seal 28 and medicinal fluid 26 drawn into fluid chamber 62 of barrel 12 are visible in relation to incremental markings 34 and accompanying numerical indicia 36 of volumetric scale 25 in digital image display window 24 (FIGS. 1 and 2) of mobile imaging device 20. For conventional medical syringes having fluid chambers with a medium to large volumetric capacity (e.g., 5 mL; 10 mL), a diameter of a barrel diameter and its corresponding circumference often allow placement of volumetric scale markings and related numerical indicia in a position where both can be viewed easily from a single viewing position. However, with medical syringes having lower volumetric capacities (e.g., 0.5 mL; 1.0 mL), a smaller associated barrel diameter and circumference may cause the volumetric scale markings and related numerical indicia to wrap around at least a portion of the circumference of the barrel, such that that both are not clearly visible from a single viewing position, which may contribute to medical errors when drawing doses of medicinal fluids into the syringes, which further demonstrates a need for the syringe dosage verification systems and methods disclosed here. Also, printing volumetric scale markings and related numerical indicia on smaller syringe barrels can prevent the use of pad-printing methods and equipment that are preferred for use in manufacturing such products at the high production rates needed to hold down unit costs for medical syringes. Some syringes may have no volumetric scale markings or numerical indicia. Note that syringe 11 does not contain any electronic components.

As depicted in FIGS. 1 and 2, mobile imaging device 20 may be a cellular telephone with a camera system and imaging capabilities, a processor, and ability to utilize application software to process a captured digital image. In some embodiments, dosage verification system 10 may be configured to selectively capture a digital image of syringe 11 and display a digital readout 38 of an actual dosage value drawn in medical syringe 10 based on the captured digital image of the syringe 11. Digital readout 38 is preferably a numeric value, e.g., as "0.46" mL. Digital readout 38 may be superimposed over a display of the captured digital image of syringe 11 on display window 24, may be displayed on display window 24 without the captured digital image also being displayed, and/or may be displayed on display window 24 with the captured digital image but without interfering with a view of the captured digital image. Grayscale shading in FIGS. 1 and 2 is intended to show for illustrative purposes a volume of medicinal fluid 26 being drawn into the fluid chamber of medical syringe 11. In the enlargement depicted in FIG. 2, the drawn dosage of medicinal fluid 26 is visible, with forwardly facing surface 30 of plunger seal 28 and a portion of handle 50 (FIGS. 5 and 6) of plunger 14 inside barrel 12 also being visible within the digital image display window 24.

In some embodiments, mobile imaging device 20 may be capable of capturing color images. As such, in some embodiments, medical syringe 11 used with dosage verification system 10 and methods disclosed herein may advantageously include one or more colored components to aid the image processing software or application software in mobile imaging device 20 recognize or discern between different components. In some embodiments, this may enhance the accuracy of the dosage verification system 10 and/or may enable the mobile imaging device and/or associated software more quickly capture and process the digital image of the syringe 11.

In some embodiments, components related to safety features may also be manufactured using materials of a given color or colors to visually emphasize the feature(s) and to help denote its current operational state (e.g., ready for use with needle tip exposed, or previously used with needle tip retracted and/or covered). Such coloration or combinations of colors may also help human users make similar component and state recognitions. Components may be of any visible color and may be referred to herein as simply "RGB elements," indicating that they may be more readily distinguished based on colors used in the typical red-green-blue pixels of digital mobile imaging device 20 or of the human-visible spectrum, including black and white.

Different components may be selectively colored so as to produce a high visual contrast. Accordingly, in some embodiments, corresponding or related components of syringe 11 and/or components that move relative to one another in syringe 11 to be imaged may comprise colors that are considered opposite of one another (or contrasting colors) on the color wheel, such as black/white, orange/blue, red/green, yellow/purple, and combinations thereof. In some embodiments, corresponding or related components of syringe 11 and/or components that move relative to one another in syringe 11 to be imaged may comprise contrasting or distinguishable grayscale colors or shades from one another. In some embodiments, corresponding or related components of syringe 11 and/or components that move relative to one another in syringe 11 to be imaged may comprise contrasting or distinguishable textures from one another.

Any number of differently colored, shaded, or textured components may be used in dosage verification system 10 (e.g., two or more different colors, two or more different grayscale shades, or two or more different textures). Further, any single component may have portions that are each differently colored; for example, plunger 14 may comprise seal 28, handle 50, and cap 52, with each possibly being a different color. In some embodiments, the contrasting or opposite colors may enhance the ability of the mobile imaging device 20 and/or the software application to discern different components to accurately verify a dosage amount in syringe 11, with or without the array of volumetric markings 36 or volumetric scale 25, or the level of medicinal fluid 26 in syringe 11 being completely visible. Thus, in some embodiments, the dosage verification system 10 may use relative locations of discernible components to read and/or verify the dosage of medicinal fluid 26 in the syringe 11 before the injection is administered.

In one embodiment, such as for transparent fluids in a sufficiently transparent barrel 12, image processing software or application software in dosage verification system 10 may determine an actual dosage based on a relative position of a portion of plunger, such as seal 28, in a captured digital image of syringe 11. In another embodiment, dosage verification system 10 may determine an actual dosage of the medicinal fluid 26 based solely on a relative position of a portion of plunger, such as seal 28, in a captured digital image of syringe 11. Likewise, image processing software may determine an actual dosage of the medicinal fluid 26 based on, or based solely on, the relative position of cap 52 in a captured digital image. Thus, in some embodiments, the volumetric scale 25 on syringe 11 (or any syringe used with dosage verification system 10) may not be necessary to determine an actual dosage of the medicinal fluid 26. However, in some embodiments, it will be appreciated that the array of volumetric markings 36 or volumetric scale 25 may be used in combination with other imaging features of the dosage verification system 10.

In one embodiment, for some fluids with discernable color, a contrast between the fluid color and barrel 12 color may be a recognizable feature for an actual dosage determination by the dosage verification system 10. In some embodiments, plunger 14, plunger seal 28, and/or front surface 30 of plunger seal 28 may be a different color from barrel 12, so a position of plunger 14 within barrel 12 can be more easily recognized in a captured digital image, regardless of fluid color. With the dosage verification system 10 knowing characteristics of syringe 11, either through identification of the syringe 11 during digital imaging or by selection of the particular syringe 11 by a user through the software application of the mobile imaging device 20, the position of plunger 14 in a captured digital image may be used to determine an actual fluid volume 62 in barrel 12, even though plunger 14 itself, or even barrel 12, of syringe 11 may bear no volumetric markings.

In some embodiments, barrel 12 may be of a first color at a forward end and a second color at a rear end, such that different portions of barrel 12 may be identified in a captured digital image being analyzed by dosage verification system 10, regardless of a position of plunger 14. Barrel 12 may also be colored in a gradient manner, such as from white to black with varying shades of gray along a length of barrel 12, such that a portion of the barrel 12 in a captured digital image may be recognized and measured by an image analysis tool, such as digital imaging device 20, by the visible portion of the grayscale in the image. Components of syringe 11 may also be made of materials, whether similar or different, that are of substantially the same color; this feature may lead a user to pay more attention to any differently colored portions of syringe 11, such as safety features.

Materials used in components of syringe 11 (or any other syringe for digital verification used with dosage verification system 10) may have at least portions subjected to different surface treatments to produce a slightly roughened matte finish or a textured finish. A matte finish surface or textured surface may reduce or altogether eliminate reflections or glare that could impart inaccuracies in an image analysis software application, by more uniformly diffusing refracted light. Additionally, a textured surface may also distinguish a portion of syringe 11 from other portions of syringe 11 to aid in processing a captured digital image, similar to differentiation using coloration, to verify a dosage amount in the syringe 11. Thus, in some embodiment, indicia display surface 15 may be transparent (or substantially transparent or translucent) and unroughened, exclusive of markings 36, while oppositely facing flat display surface 17 may be roughened to a matte finish to provide a better background that yields a clearer view of medicinal fluid 26 inside syringe 11. Incremental markings 36 on volumetric scale 25 may be colored such as to enhance contrast with both a medicinal fluid and barrel 12. In some embodiments, these markings 36 may also be printed over lines that have been laser etched to produce slightly roughened regions where the printing will transfer better.

Mobile imaging device 20 may be positioned at any angle, distance, and/or orientation with respect to syringe 11 to capture a digital image to be processed to determine the dosage value, so long as syringe 11 is within the field of view (i.e., viewing field 22). Further, it is not necessary to position mobile imaging device 20 substantially perpendicular to syringe 11 to capture the digital image. Embodiments of the software application in dosage verification system 10 are preferably configured to compensate for different camera positions (including different angles, distances, or both) relative to syringe 11 when determining the actual dosage volume from a captured image. Further, embodiments of the software application may be configured to compensate for movement of the mobile imaging device 20 (or a camera of mobile imaging device 20) during image capture. Thus, dosage verification system 10 may preferably be configured to compensate for slight hand movements or user having a shaky hand while using mobile imaging device 20 to capture a digital image of syringe 11. These features aid in allowing dosage verification system 10 to utilize a handheld mobile imaging device 20, such as a cellular telephone, without requiring an imaging device to be mounted or requiring utilization of a specialized case or mounting apparatus to position syringe 11 and mobile imaging device 20 in any specific spatial relationship.

Although specific spatial relationship between mobile imaging device 20 and syringe 11 is not necessary to capture a digital image and process it to determine an actual dosage, dosage verification system 10 may be configured to provide guidance to a user to facilitate improved spatial relationship to enhance digital imaging of syringe 11. In some embodiments, dosage verification system 10 may execute application software that presents a geometric shape on display window 24 to aid a user in aligning mobile imaging device 20 and syringe 11 for image capture. A geometric shape may comprise an outline of syringe 11 or of a different syringe that resembles syringe 11. A user may modify an angle and distance of mobile imaging device 20 relative to syringe 11 using the displayed geometric shape so that the displayed geometric shape and syringe 11 are substantially aligned to allow capture of an improved digital image suitable for processing by the application software. In another embodiment, a displayed geometric shape may be slightly larger than an outline of syringe 11. This may allow a user to position mobile imaging device 20 over syringe 11, such that the image of the syringe 11 on display window 24 is substantially contained within the displayed geometric shape. Consequently, exact alignment of any displayed geometric shape on the display window 24 and the syringe 11 are not required for the dosage verification system 10 to accurately determine or verify an actual dosage of the medicinal fluid 26 in the syringe 11.

Figure 4:
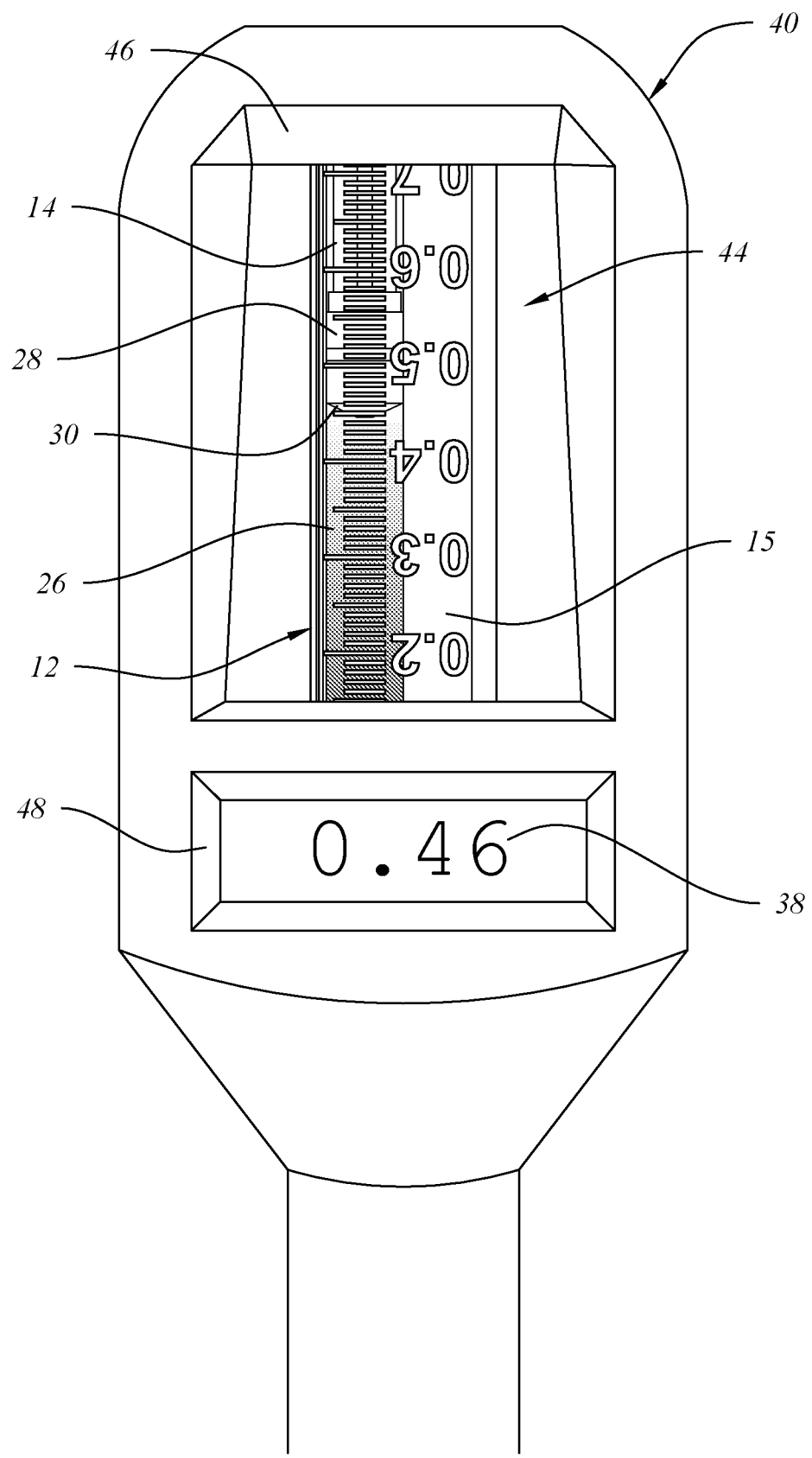
FIG. 4 is an enlarged top plan view of a digital display portion of the mounted digital imaging device of the dosage verification system of FIG. 3 with a digital image showing a portion of a volumetric scale and related numeric indicia disposed on an upwardly facing surface of syringe barrel and overlying a fluid chamber containing a drawn dose of a medicinal fluid (shaded in the drawing)

Referring to FIGS. 3 and 4, another embodiment of a dosage verification system 75 is shown according to an embodiment of the disclosure. Dosage verification system 75 may generally comprise a digital imaging device 40 that may be mounted to a cart or bed frame in a hospital room, medical treatment area, or pharmacy by an apparatus, such as a hinged support rod 50, and adjustably positioned as needed to permit a user or medical caregiver to utilize the dosage verification system 75 to verify an actual dose of a medicinal fluid 26 drawn into a syringe 11. As previously shown and similarly described in relation to dosage verification system 10, medical safety syringe 11 comprises a barrel 12 further comprising an outwardly facing flat surface 15 having a volumetric scale 25 with individual incremental markings 34 and accompanying numerical indicia 36 overlying the fluid chamber 62 (visible in FIG. 5) inside barrel 12. As shown in FIGS. 3 and 4, digital imaging device 40 comprises a display screen 44 bounded by walls 46 and depicting an image captured within an adjustable viewing field 42 that is focused upon an upwardly facing, flat image display surface 15 of the barrel 12 of medical syringe 11.

Although not shown in FIG. 3, it should be understood that digital imaging device 40 may be operatively connected or connectable to a laptop or work station configured to capture, process, record, store, and transmit captured digital images as needed to verify an actual dose of medicinal fluid 26 drawn into syringe 11 prior to an injection, trigger an audible, visual, or tactile alert as needed to notify a user or third party if the drawn dosage of the medicinal fluid 26 is incorrect (e.g., too high or too low, leading to distinguishable alerts), and produce an achievable record of the dose administered in an injection for possible future use. As such, a user may locally or remotely access a database containing captured images (in addition to other data) and retrieve the captured image to see the dosage relative to the volumetric scale 25 having the incremental markings 34 and accompanying numerical indicia 36 on the syringe (e.g., barrel, plunger, or other components), either with or without the text or numeric values determined by the image processing software. Accordingly, the dosage verification system 75 may be capable of electronic reporting on dosages for multiple injections without the need to manually enter the data. Further, the data derived from the captured images, time and date information, and linked data (e.g., pharmacy records, prescriptions, etc.) may all be retrieved, either locally or remotely from an electronic device such as a mobile communication device, tablet, or computer.

A first data set comprising information describing the dimensions of a syringe and the corresponding volume of the syringe may be accessed to determine the actual dosage volume from geometric data extracted from a captured image. The first data set may also comprise the name of the medicinal fluid or information identifying a patient to receive the actual dosage. The first data set may also comprise the captured image itself. A second data set comprising a predetermined dosage volume (i.e., the appropriate dosage for a particular patient) may also be accessed, for comparison against the actual dosage volume. The predetermined dosage volume may be based on medical records including typical dosages, medical histories, insurance reporting, billing, a biometric reading such as a blood glucose level, and/or valid prescriptions. For example, in some embodiments, data from a glucose monitor may be correlated to a predetermined dosage volume needed by a diabetic patient. An alert may be provided to the patient if the actual dosage volume is inconsistent with either the predetermined dosage volume or a typical dosage volume for a given time of day.

Referring again to FIGS. 3 and 4, display 44 provides, in a single image, a clear and focused view of a dosage of medicinal fluid 26 drawn into the fluid chamber 62 of barrel 12 forwardly of the front surface 30 of the plunger seal 28 of plunger 14. Additionally, in some embodiments, imaging device 40 may comprise a readout window 48 comprising a liquid crystal display or other display, which may display a digital numerical readout of the dosage of the medicinal fluid 26. For example, in the embodiment shown, readout window 48 is showing "0.46" (mL) as the volumetric dosage of the medicinal fluid 26 drawn into barrel 12 of medical syringe 11 as the imaging device 40 and its associated software application interprets the dosage based on the captured digital image.

The structure and operation of medical syringe 11 are further described and explained in relation to FIG. 5. Medical syringe 11 comprises unitarily molded barrel 12 having two longitudinally extending passageways: fluid chamber 62 defined by a cylindrical, inwardly facing wall; and needle retraction chamber 64 that may be longitudinally coextensive and laterally offset from the fluid chamber 62 and sharing a common wall that fluidly separates the fluid chamber 62 from the needle retraction chamber 64. Plunger 14 of medical syringe 11 is depicted with plunger handle 50 and plunger seal 28 partially inserted into barrel 12. A protective needle cap (not shown) is removed to place medical syringe 11 in condition for drawing a dose of a medicinal fluid 26 from a vial (not shown) into the fluid chamber 62 (FIG. 5). Medicinal fluid 26 can enter fluid chamber 62 in front of front surface 30 of plunger seal 28 as plunger cap 52 of plunger 14 is pulled rearwardly after hypodermic needle 16 has been inserted into a vial of medicinal fluid 26 or vaccine. As shown in the embodiment of FIGS. 5, the safety feature of syringe 11 is activated by applying transverse digital pressure to a touchpad of a frontal attachment 18 (e.g., needle safety actuator), thereby moving the hypodermic needle 16 laterally from being coaxially aligned with the fluid chamber 62 of barrel 12 to being coaxially aligned with an opening into needle retraction cavity 64. This lateral repositioning allows a spring 56 that rearwardly biases a needle holder 58 comprising the hypodermic needle 16 to expand, driving the needle holder 58 rearwardly into needle retraction cavity 64 and also propelling the front tip end of hypodermic needle 16 rearwardly to a position where the needle tip is no longer exposed and cannot cause an accidental needle stick following an injection.

Figure 6:
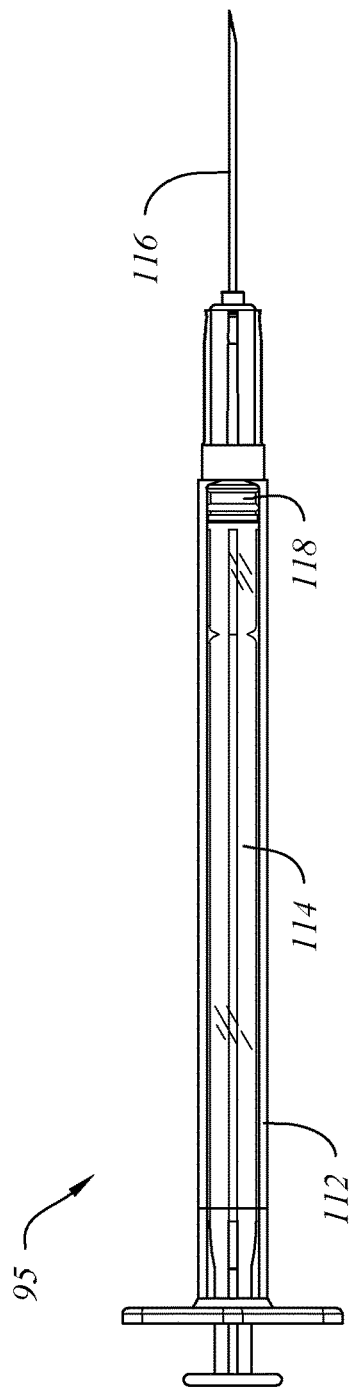
FIG. 6 is a longitudinal side elevation view of a conventional medical syringe having an elongate tubular barrel with a cylindrical fluid chamber of known maximum nominal volumetric capacity (e.g., 0.5 mL; 1.0 mL, 2.0 mL but, for illustrative simplification as explained in the following description, without a volumetric scale and related numeric indicia), wherein the conventional medical syringe has a needle projecting forwardly from the barrel, and a plunger with a plunger seal fully inserted inside the barrel.

According to another embodiment as more specifically discussed below in relation to FIGS. 6-9, a dosage verification system 85 and method of use are provided that can be effectively utilized with medical syringes 95 having barrels 112 in which the drawn dosage level is not clearly visible, or where the barrel 112 has illegible or hard-to-read volumetric markings or indicia, or even when the barrel wall is opaque. Referring to FIGS. 6-7, a conventional syringe 95 having a known rated volumetric capacity is depicted that has an optically transparent barrel 112 without a volumetric scale or other visible numerical markings. In practice, some syringes are pre-filled, and volumetric capacities are sometimes incorporated onto the packaging materials of such syringes rather than on the syringe itself. Hypodermic needle 116 is projecting forwardly from barrel 112, and plunger 114 is fully inserted inside barrel 112, with plunger seal 118 advanced into contact with the front end of barrel 112.

Dosage verification system 85 is disclosed for use in verifying a dose of medicinal fluid disposed inside the fluid chamber 120 of transparent barrel 112 (as with a factory-prefilled syringe) lacking visible volumetric scale markings or related numerical indicia. Referring to FIG. 8, dosage verification system 85 comprises a mobile imaging device, which in the embodiment shown comprises a cellular telephone 102 comprising a camera lens 104 having a viewing field 106 positioned to capture and store one or more digital images from which the volume of the fluid dose being administered can be recorded and stored prior to an injection. Cellular telephone 102 may be configured and programmed, for example, through use of a downloadable software application to capture digital images and store the digital images from which the position of plunger 114 relative to barrel 112 and the scalar distances "A" and "B" as shown in FIG. 8 can be determined. Distance "A" represents the distance between the front of fluid chamber 120 and the position of plunger seal 118 after the dosage is drawn. Distance "B" represents the full length of fluid chamber 120 when plunger 114 is withdrawn to a "maximum fill position" (corresponding to the maximum rated volumetric capacity of syringe 95). Assuming the maximum rated volumetric capacity of syringe 95 is known, by the software application accessing a database either locally or remotely, and that cellular telephone 102 is positioned relative to syringe 95 so as to frame the syringe 95 within the viewing field 106, and further assuming that fluid chamber 120 has the same cross-sectional area over distances "A" and "B" as determined by the software application, the volumetric measure of any lesser drawn dosage inside fluid chamber 120 may be determined by multiplying the ratio of A:B by the maximum rated volumetric capacity of syringe 95.

Figure 9:
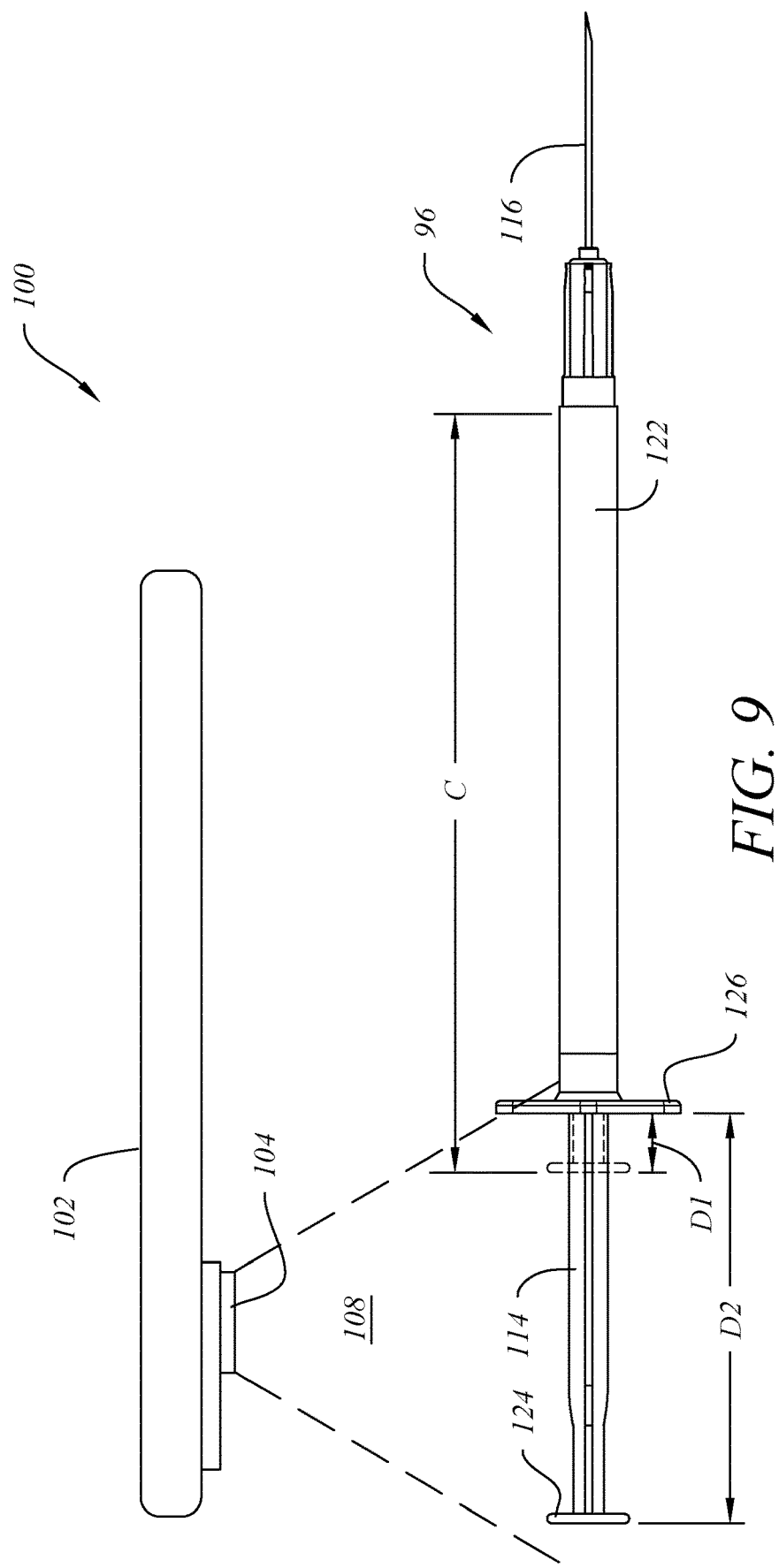
FIG. 9 is another view of the embodiment as in FIG. 8 except that the barrel is opaque and the portable imaging device is repositioned to adjust the viewing field to include an area by which the plunger handle extends rearwardly from the barrel by a distance after the dose of medicinal fluid is drawn into the barrel.

In an embodiment described in relation to FIG. 9, dosage verification system 100 is disclosed for use in verifying a dose of medicinal fluid disposed inside the fluid chamber of a barrel 122 of medical syringe 96. In some embodiments, the barrel 122 may be opaque, translucent, textured, or include markings that do not readily enable reading of a liquid level inside the fluid chamber of the barrel 122. In some embodiments, the barrel 122 may not include visible volumetric scale markings or related numerical indicia, which also inhibits reading of the liquid level inside the fluid chamber of the barrel 122. Plunger 114 of FIG. 7 may be used in either of medical syringe 95 (FIG. 8) or medical syringe 96 (FIG. 9), which may comprise the same or substantially similar maximum rated volumetric capacities.

Referring to FIG. 9, dosage verification system 100 comprises a mobile imaging device, which in the embodiment shown comprises a cellular telephone 102 comprising a camera lens 104 having a viewing field 108 positioned to capture and store one or more digital images from which the volume of the fluid dose being administered can be determined and recorded prior to an injection. Cellular telephone 102 may be configured and programmed, for example, through use of a downloadable application software to capture digital images and store the digital images from which the position of plunger 114 relative to barrel 112 and the scalar distances "D1" and "D2" as shown in FIG. 9 can be determined. In FIG. 9, scalar distance "D1" represents the distance from barrel flange 126 to thumb cap 124 of plunger 114 when plunger 114 is fully inserted inside the barrel 122 of syringe 96, and the associated volume of the fluid chamber inside barrel 122 is zero. By comparison, scalar distance "D2" represents the distance from the barrel flange 126 to the thumb cap 124 of plunger 114 when plunger 114 is withdrawn after drawing an injectable dose of medicinal fluid into the barrel 122. Assuming the maximum volumetric capacity of syringe 96 is known, by the software application accessing a database either locally or remotely, and that cellular telephone 102 is positioned relative to syringe 96 so as to frame the syringe 96 within the viewing field 108, and further assuming that the fluid chamber inside barrel 122 has the same cross-sectional area over the distance by which plunger 114 is withdrawn prior to injection as determined by the software application, the volumetric measure of the drawn dosage inside the fluid chamber of barrel 122 may be determined by multiplying the maximum rated volumetric capacity of syringe 96 by the ratio of "D2" minus "D1" to the overall length of the fluid chamber ((D2−D1)/Length$_{FC}$) when the fluid chamber of barrel 122 is filled to the maximum rated volumetric capacity (distance "B" as described above in relation to syringe 95 of FIG. 8).

Figure 10:
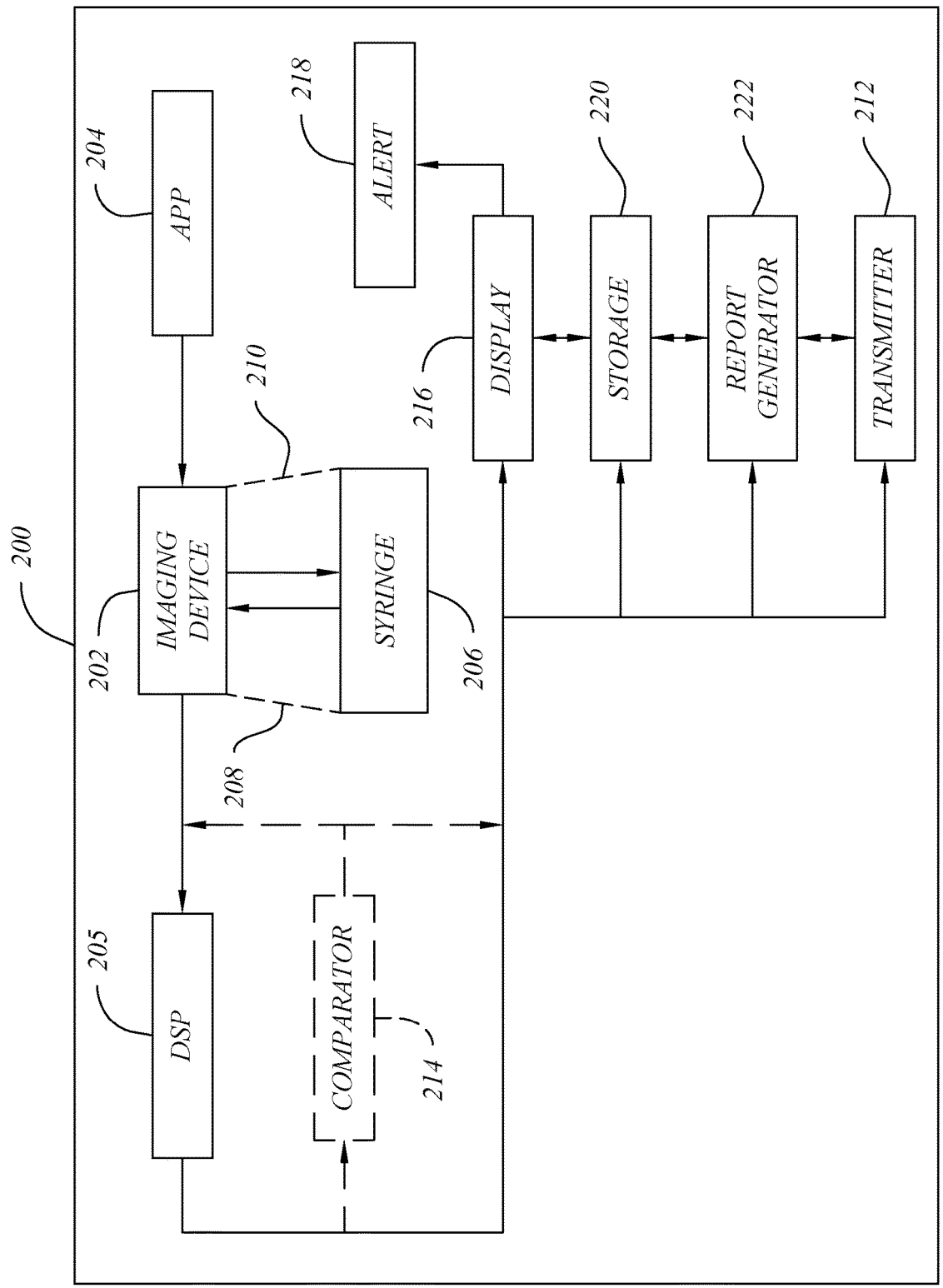
FIG. 10 is a schematic diagram of an embodiment of a dosage verification system with an imaging device disposed in a use position above a medical syringe and also showing exemplary ancillary elements of the system disposed in a configuration useful for implementing functionality and method of operation.

FIG. 10 shows a schematic diagram of a dosage verification system 200. Dosage verification system 200 may generally be configured to verify and create a historical record of the dose of medicinal fluid drawn into the fluid chamber of a medical syringe prior to administering an injection. Dosage verification system 200 may comprise a portable imaging device 202 positioned to view and capture a digital image of syringe 206 within a viewing field defined by boundaries 208, 210 as further described previously for viewing fields 22, 42, 106 and 108 in relation to FIGS. 1-9.

In some embodiment, portable imaging device 202 is configured by application software 204 to focus on and capture a clear image of the indicia display surface and volumetric scale (both individual indicia and accompanying numerals) of the barrel of the syringe 206 in relation to the dosage of a medicinal fluid drawn into the fluid chamber of the barrel of the syringe 206 as previously described in relation to FIGS. 1-9 above. Application software 204 may be downloadable onto a mobile imaging device 202, such as a cellular telephone, tablet, or laptop having digital imaging capabilities or accessible by Wi-Fi, internet, or other known technologies. In some embodiments, the application software 204 may be configured via a digital signal processor 205 or other conventional known processing device and circuitry to control, process, and communicate the digital images viewed and captured by the imaging device 202 to a display 216, storage device 220, or media (each of which may be external or embodied in imaging device 202), or operatively linked by a transmitter 212 and/or report generator 222 to another achievable and indexed database.

According to some embodiments of the dosage verification system 200, the digital images viewed and captured by imaging device 202 are optionally analyzed in relation to predetermined parameters by a comparator 214 or other similarly effective device or circuitry (with or without transmission to external devices) configured to generate a visual, audible, or tactile alert 218 informing a user that the dose of medicinal fluid drawn into syringe 206 is correct. In some embodiments, dosage verification system 200 may also be configured to generate a visual, audible, or tactile alert 218 informing a user that the dosage of medicinal fluid drawn into syringe 206 is more or less than the prescribed or intended dosage. Similarly, dosage verification system 200 may be configured to sequentially image the dosage in the same syringe 206 multiple times within a short period to provide assurance that the medicinal fluid dosages as determined from the captured images are accurate, reproducible, and consistent within an acceptable range. In some embodiments, the dosage verification system 200 may also log a date, time, and/or location with the dosage information as to when the injection was administered. In some embodiments, the captured digital images may be stored locally on the digital imaging device 200 and/or uploaded to a cloud computing system or other database, which may allow selective retrieval of the data in the future to verify dosages, review treatment history, or the like.

Generally, where components of the technology described are implemented in whole or in part using software in one aspect, these software elements may be implemented to operate with a computing or one or more processing components capable of carrying out the functionality described. Even though various features or elements of functionality may be individually described or claimed as separate components, one of ordinary skill in the art will understand that these features and functionality may be shared among one or more common software and hardware elements. The imaging device 202 is thus one exemplary computing component that may represent multiple such components in practice.

The application software 204 may also be executed by, for example, computing or processing capabilities found within desktop, laptop, and notebook computers, hand-held computing devices (personal digital assistants (PDAs), smart phones, cell phones, palmtops, etc.), mainframes, supercomputers, workstations or servers, or any other type of special-purpose computing devices as may be desirable or appropriate for a given application or environment. Processing might be implemented using a special-purpose processing engine such as, for example, a microprocessor, controller, or other control logic. Such processing may also involve one or more memory components, such as random-access memory (RAM) or other dynamic memory for storing information and instructions to be executed by the processor.

Accordingly, storage 220 may comprise any fixed or removable medium that is read by, written to, or accessed by the application 204. As these examples illustrate, the storage 220 may include a non-transitory computer-readable storage medium having stored or embedded computer software or data. The terms "computer program medium" and "computer usable medium" are used to generally refer to media such as, for example, storage 220. This and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the system 200 to perform features or functions of the disclosed technology as discussed herein.

Figure 11:
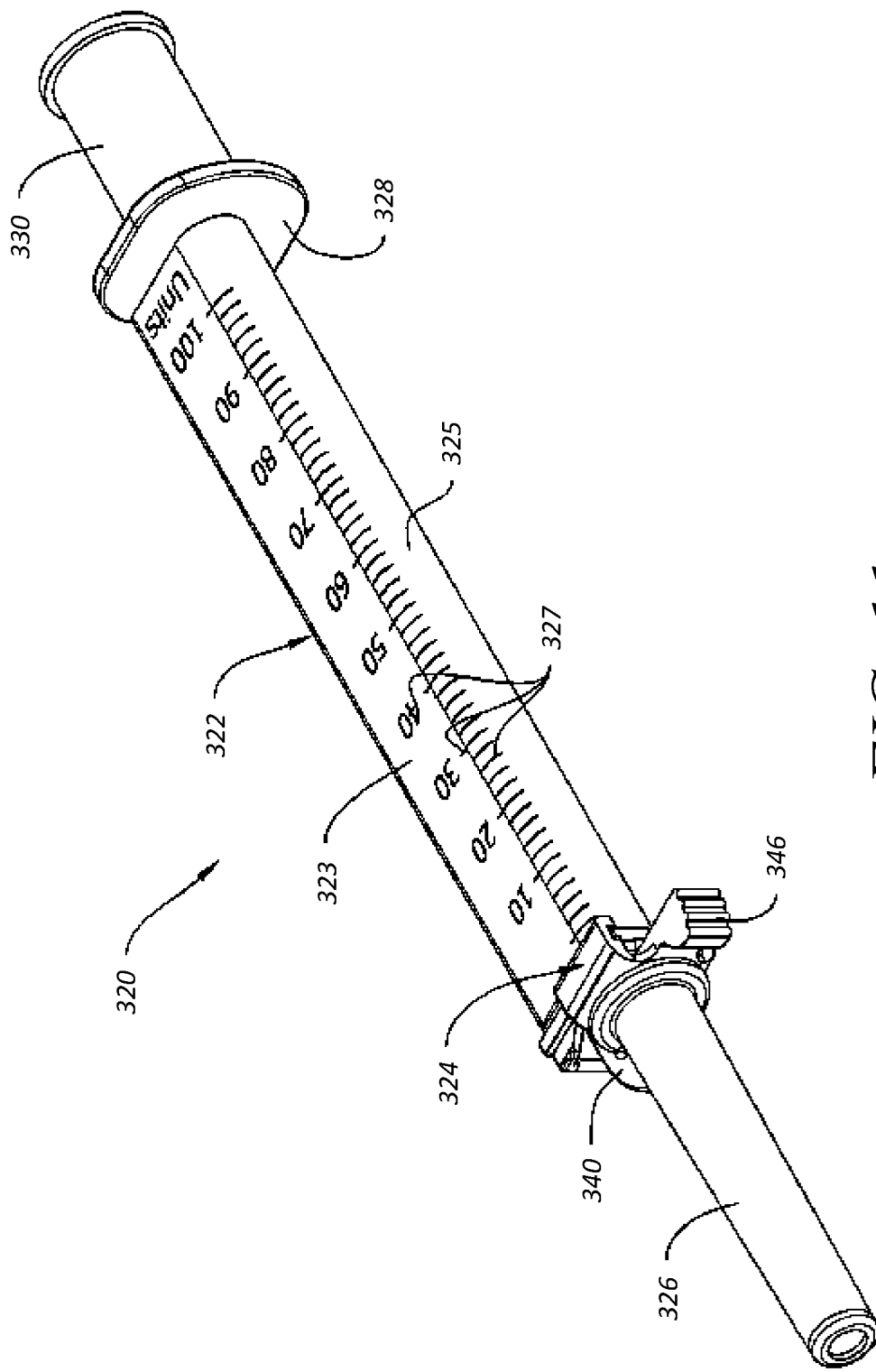
FIG. 11 is a top front perspective view a medical syringe according to an embodiment herein with a needle retraction mechanism.

Referring to FIG. 11, a medical syringe 320 is shown according to an embodiment of the disclosure. Medical syringe 320 comprises a needle retraction mechanism and includes a needle cover 326 (including a locking member 340) and a plunger end cap 330 that are installed in a position where syringe 320 may be safely packaged, shipped, and stored. In this configuration, locking member 340 of needle cover 326 may restrict lateral sliding movement of the frontal attachment 324 relative to the barrel 322 prior to use. Syringe 320 may comprise barrel 322 that includes substantially flat display surface 323, frontal attachment 324, outside wall 325 of fluid chamber 375 (visible in FIG. 19), selectively removable needle cover 326, an array of volumetric measuring indicia 327, finger flange 328, removable plunger cap 330 and locking member 340. As shown in FIG. 11, principal volumetric measuring indicia 327 are applied to the substantially flat display surface 323, including for example at least the numerals identifying the number of fluid units and the associated principal measurement indicia. It will be appreciated, however, that the accompanying figures of the drawings are for illustrative purposes, and placement of some features, such as the secondary unit markings 327 relative to substantially flat display surface 323, may vary from the positions shown. At least a portion of secondary unit markings 327 may commence on the substantially flat display surface 323 or proximal to the edge of the substantially flat display surface 323, and optionally continues for at least a short distance onto the curved outer wall of fluid chamber 325. Such placement is understood to be within the operational capabilities of conventional pad printing technology that is within the purview of those having ordinary skill in the art.

In some embodiments, an adhesive sticker (not shown) may be attached to the front of barrel 322 or on a portion of flat display surface 323 (described later regarding FIG. 19) extending laterally from the barrel 322 without interfering with a dosage volume measurement. The sticker may include information regarding the medicinal fluid, such as a pharmacy label, or may include a QR code to provide access to the information remotely. In some embodiments, the flat portion extending from the side of barrel 322 may be laser etched to create a slightly roughened area, which may enhance adherence of the sticker. The roughened area may also hold ink better, such as for printing secondary unit markings 327. Having printed indicia on flat display surface 323 may be helpful in some embodiments for ensuring proper orientation of barrel 322 relative to frontal attachment 324 during manufacture, or for proper connection of a separate needle that is connected to barrel 322 at time of use.

Figure 19:
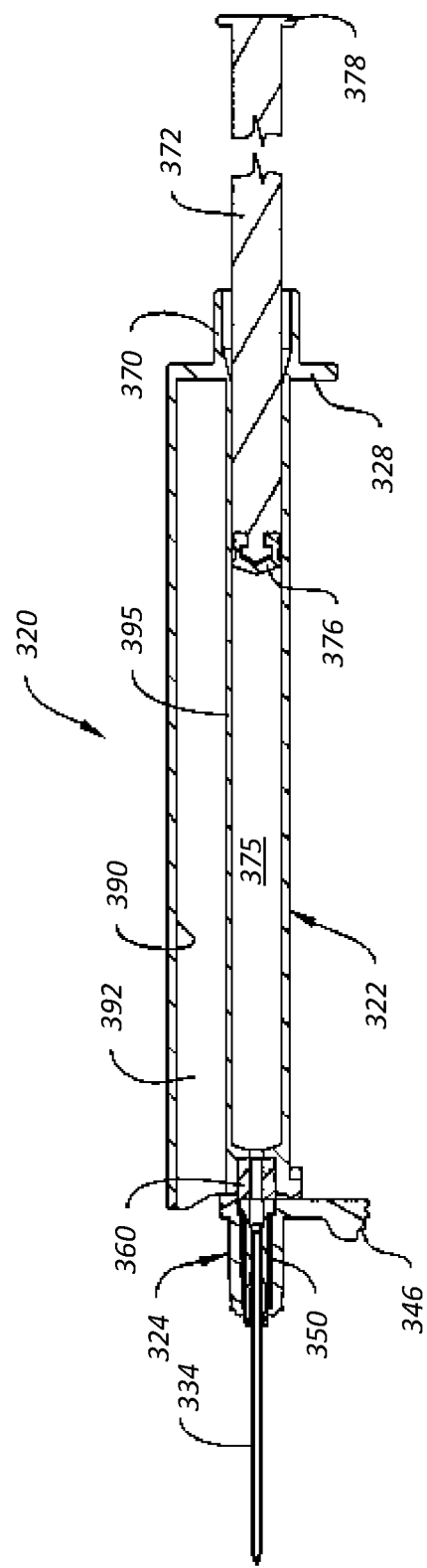
FIG. 19 is a cross-sectional view taken along line 309-309 of FIG. 18.
Figure 22:
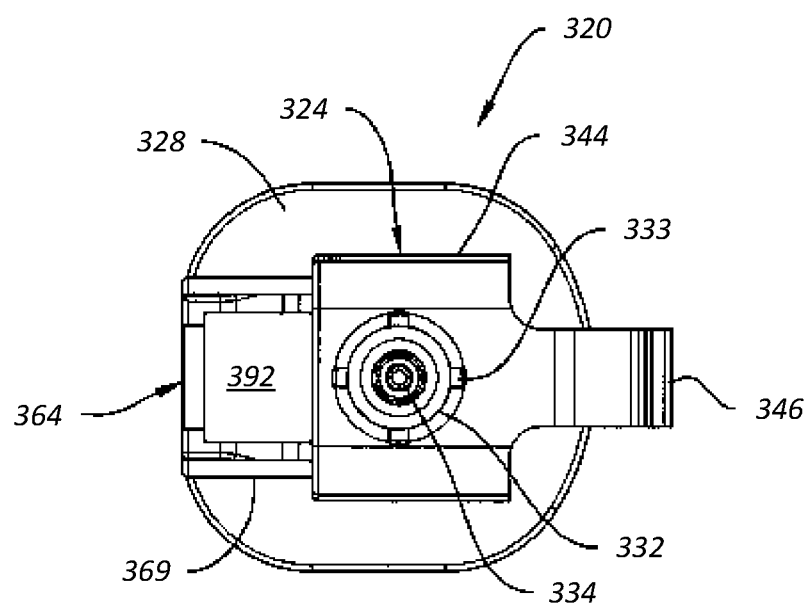
FIG. 22 is a front elevation view of the embodiment of FIG. 12.

As depicted in FIG. 11, syringe 320 has frontal attachment 324 shown in the "pre-use" configuration with needle cover 326 and locking member 340 in place to prevent frontal attachment 324 from shifting laterally relative to barrel 322 prior to use because of pressure inadvertently applied to textured touch pad 346 or to the opposite side of barrel 322. Removable plunger cap 330 is also installed behind finger flange 328 to prevent the plunger (not visible) from being accidentally withdrawn from barrel 322 and to prevent inadvertent contamination inside the rear opening of barrel 322 or around the rearwardly extended handle portion of the plunger, as seen in FIG. 19, which is discussed below. Finger flange 328 includes a flat portion, which may help keep syringe 320 lying flat on a surface, without rolling, when the image is captured.

Figure 12:
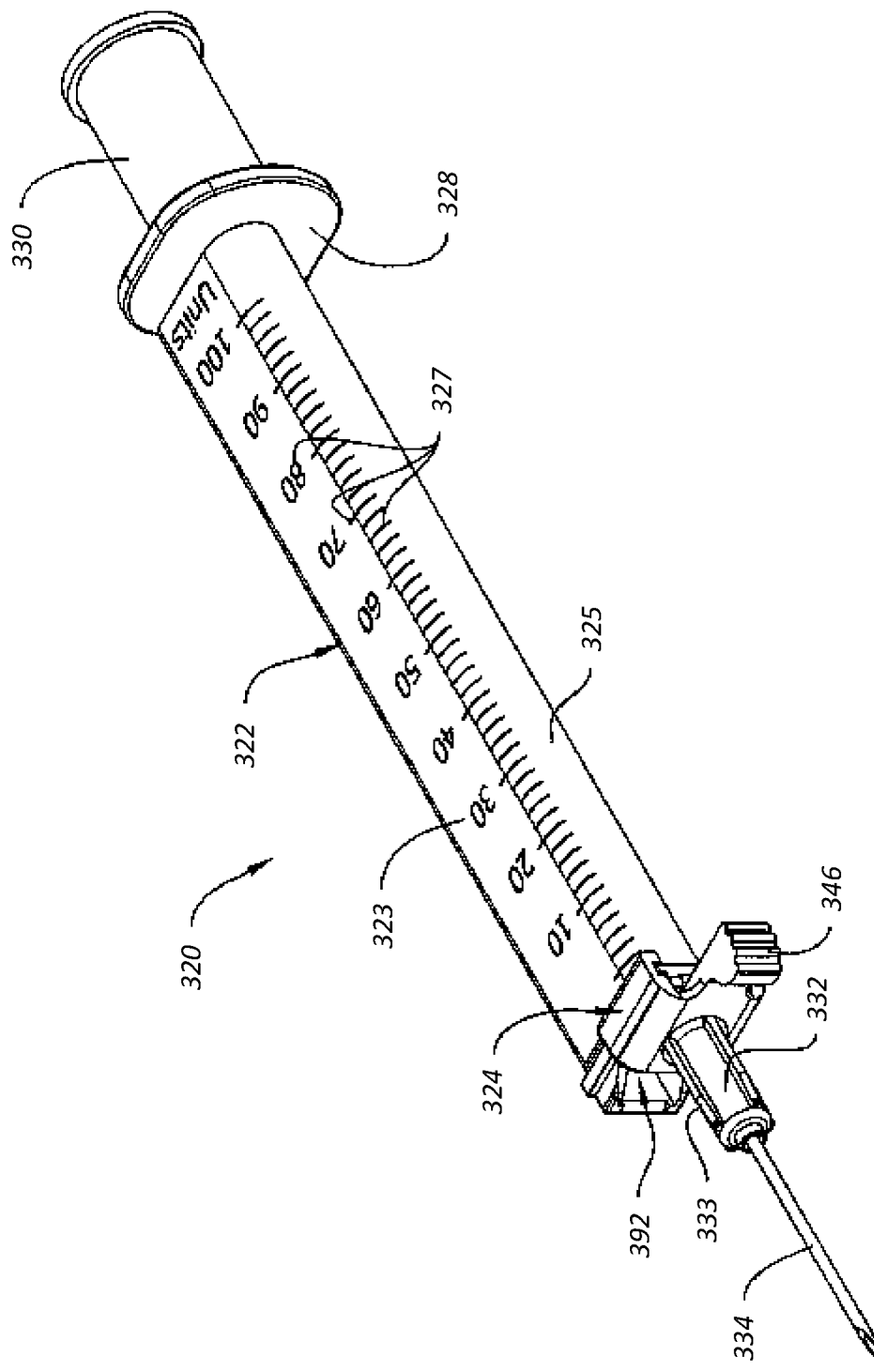
FIG. 12 is a top front perspective view of the embodiment of FIG. 11 in which a needle cover is removed.

Referring to FIGS. 12, 14-15, and 22, barrel 322 and frontal attachment 324 of syringe 320 are shown in the same position as in FIG. 11 except that needle cover 326 (with locking member 340) is removed. The front opening into needle retraction cavity 392 is more clearly visible, and needle 334 is also visible, projecting forwardly from needle support member 332 of frontal attachment 324. Circumferentially spaced, axially tapered ribs 333 are disposed around needle support member 332 and provide surfaces for frictional engagement with the inside surface of needle cover 326 prior to removal. In FIG. 12, needle 334 is coaxially aligned with the longitudinal axis through fluid chamber 375 (FIG. 19).

Figure 13:
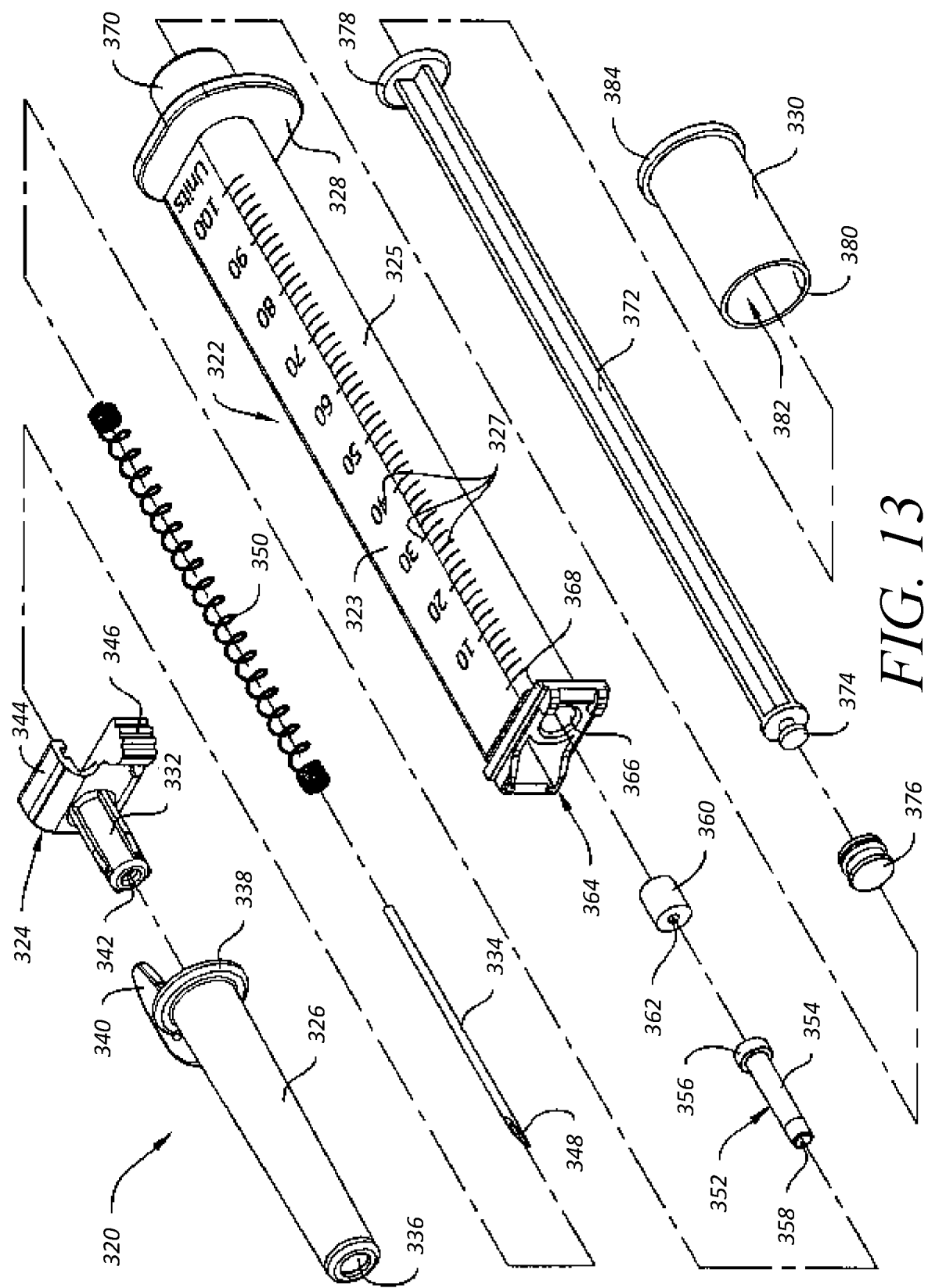
FIG. 13 is an exploded top front perspective view of the embodiment of FIG. 11.

Referring to FIG. 13, needle cap 326 of syringe 320 further comprises a forwardly facing, inwardly tapered, substantially cylindrical sidewall having front end 336, rearwardly facing annular collar 338, and locking member 340 projecting rearwardly past annular collar 338. Frontal attachment 324 further comprises forwardly projecting, substantially tubular needle support member 332 with front opening 342, upper guide member 344, lower guide member 345 (visible in FIG. 17), and laterally projecting textured touch pad 346.

Syringe 320 includes needle 334 with forwardly facing beveled needle tip 348, and a needle retraction mechanism further comprising coiled compression spring 350 and needle holder 352. Needle holder 352 further comprises an elongated shaft 354 with tubular bore 358 that is insertable into the rear of spring 350. The diameter of head 356 of needle holder 352 is sufficiently greater than the inside diameter of spring 350 that spring 350 can be held in compression by head 356 when frontal attachment 324 is slidably engaged with front portion 64 of barrel 322 as discussed in relation to FIGS. 16 and 17 below. The rear end of needle 334 is insertable into tubular bore 358 of needle holder 352 and attachable in fixed relation to the inside of elongated shaft 354 by any suitable, commercially available means such as an adhesive. Although a needle retraction mechanism as disclosed here is satisfactory for use in syringe 320, it will be appreciated that other similarly effective elements and mechanisms useful for rearwardly biasing needle 334 inside syringe 320 can also be used.

Still referring to FIG. 13, annular polymeric fluid seal 60 with tubular bore 362 is insertable into recess 66 in front portion 364 of barrel 322 so that the forwardly facing end of seal 360 is disposed in abutting contact with rearwardly facing head 356 of needle holder 352 when the needle retraction mechanism is installed inside frontal attachment 324 and frontal attachment 324 is attached in slidable engagement with front portion 364 of barrel 322. When frontal attachment 324 of syringe 320 is assembled to front portion 364 of barrel 322 during manufacture, a continuous, substantially linear, fluid flow path is established through needle 334, needle holder 352 and annular fluid seal 360 into tubular, longitudinally extending fluid chamber 375 (visible in FIG. 19).

In addition to front portion 364, barrel 322 further comprises substantially flat display surface 323, curved outside wall surface 325, finger flange 328 and rearwardly projecting annular collar 370. During assembly of syringe 320, elastomeric plunger seal 376 is installed on forwardly projecting boss 374 on the front end of plunger handle 372 opposite rearwardly facing plunger thumb pad 378, and plunger handle 372 is then inserted into a rearwardly facing opening defined by annular collar 370. Assembly of syringe 320 is then completed by installing substantially cylindrical plunger cap 330 on the rearwardly facing end of barrel 322. Plunger cap 330 further comprises open front end 380, cylindrical bore 382 and closed rear end 384. Plunger cap 330 is installed around plunger thumb pad 378 and in frictional engagement with the outside wall of annular collar 370. Volumetric measuring indicia 327 applied as discussed in relation to FIG. 11 also appear on the outwardly facing portions of substantially flat display surface 323 and curved outside wall surface 325.

Figure 16:
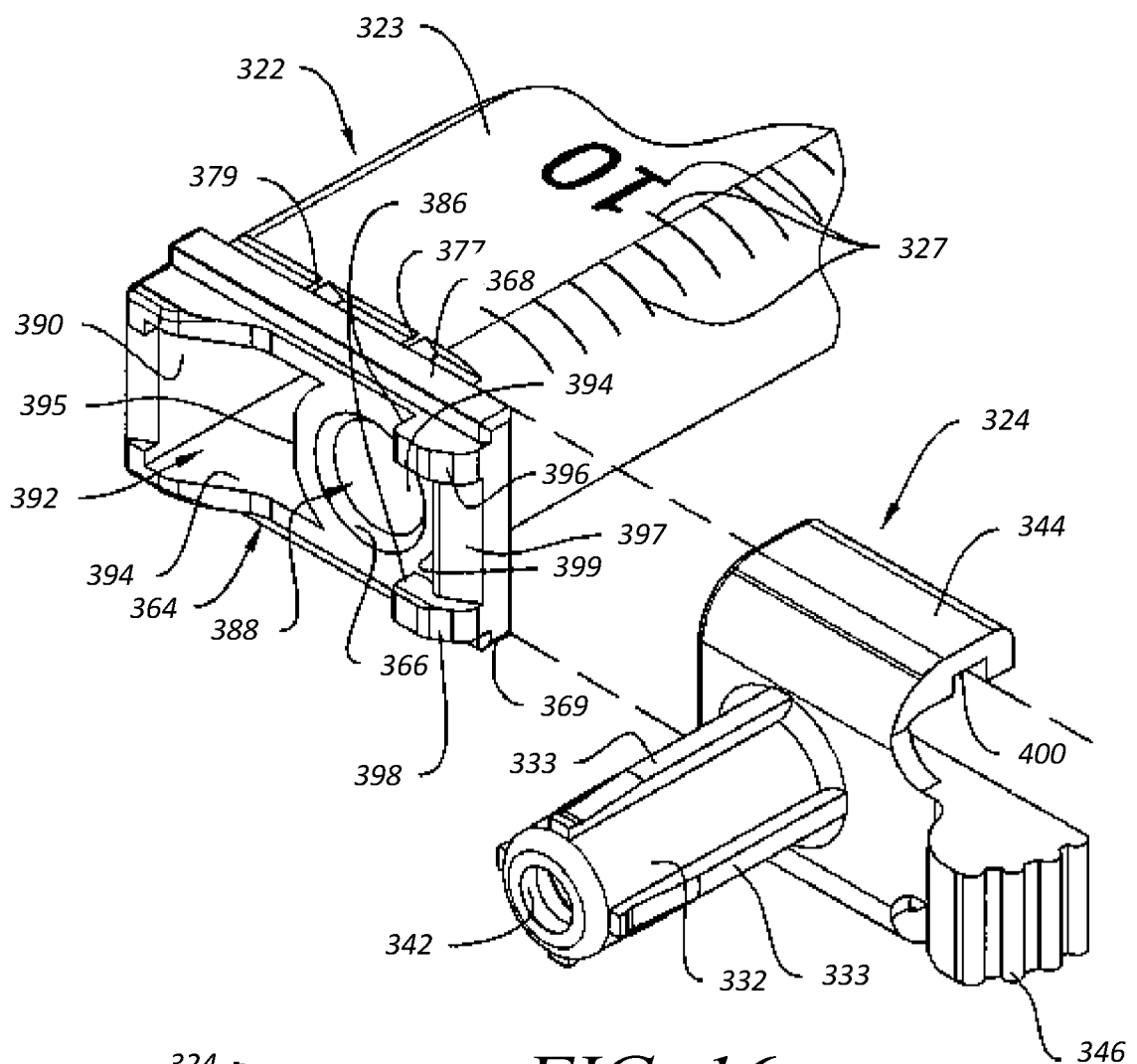
FIG. 16 is an exploded detail perspective view, partially broken away, of a frontal attachment of the embodiment of FIG. 13 shown in juxtaposition to a front portion of a barrel of the embodiment of FIG. 13.

FIGS. 13, 16, and 21 further disclose the forwardly facing opening into needle retraction cavity 392 in relation to front portion 364 of barrel 322. Needle retraction cavity 392 has a closed rear end that is adjacent to finger flange 328, and is bounded by side walls 390, 395, bottom wall 394, and a top wall that also includes upwardly facing, substantially flat display surface 323 of barrel 322.

Figure 17:
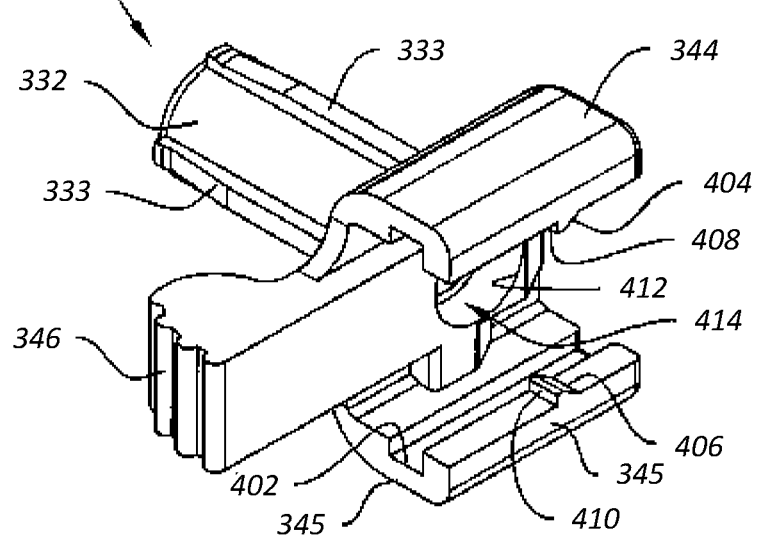
FIG. 17 is a top rear perspective view of the frontal attachment of FIG. 13.

The assembly of frontal attachment 324 to front portion 364 of barrel 322 of syringe 320 is further described and explained in relation to FIGS. 16 and 17. Referring to FIG. 16, annular fluid seal 360 (visible in FIG. 13) is first inserted into recess 366 of front portion 364 of barrel 322. Front portion 364 further comprises laterally extending top rail 368 and bottom rail 369 that are disposed in transverse relation to the longitudinal axis through fluid chamber 375 (FIG. 19) of barrel 322. Rounded attachment guides 396, 398 are disposed forwardly of top and bottom rails 368, 369, respectively, and are configured to facilitate the assembly of frontal attachment 324 to front portion 364 of barrel 322 by passing above and below the arm connecting textured touch pad 346 to the back side of frontal attachment 324.

Referring to FIG. 17, annular opening 412 is provided in the back side of frontal attachment 324 to facilitate insertion of spring 350 and needle holder 352, discussed above in relation to FIG. 13, and spring 350 is compressed between an annular shoulder inside front opening 342 (visible in FIG. 21) and is held in compression behind head 356 of needle holder 352 while frontal attachment 324 is moved into sliding engagement with front portion 364 of barrel 322. Frontal attachment 324 further comprises upper guide 344 having a downwardly facing, laterally extending recess 400 and lower guide 345 having an upwardly facing, laterally extending recess 402. Upper ramp and lower ramp 404, 406, respectively, of frontal attachment 324 are configured to slide over two laterally spaced-apart sets of opposed ramps with blocking shoulders 377, 379 (the lower set not being visible in FIG. 16).

Laterally extending top rail 368 and bottom rail 369 of front portion 364 of barrel 322 are cooperatively engaged with upper and lower recesses 400, 402, respectively, by sliding frontal attachment 324 onto front portion 364 of barrel 322 when frontal attachment 324 and front portion 364 are positioned as shown in FIG. 16. As pressure is applied to textured touch surface 346, frontal attachment 324 moves along rails 368, 369 until top and bottom blocking shoulders 408 of upper guide 344 pass over and then drops into facing relation to upper and lower blocking shoulders 377. At this time, needle support member 332 and needle holder 352 (not shown in FIGS. 16 and 17) are coaxially aligned with the longitudinal axis of fluid chamber 75 (visible in FIG. 9). Any attempt to move frontal attachment 24 back to a disconnected position as shown in FIG. 6 will be resisted by facing and abutting contact between upper and lower blocking shoulders 377 of front portion 364 and top and bottom blocking shoulders 408, 410, respectively, of frontal attachment 324.

FIGS. 14 and 15 depict syringe 320 of FIG. 12 with the needle cover removed and with plunger cap 330 still in place and with textured touch surface 346 in the initial position relative to barrel 322 as described above. Needle 334 is installed inside bore 358 of needle holder 352, which is seated inside needle support member 332 of frontal attachment 324, with spring 350 compressed between head 356 (FIG. 13) of needle holder 352. Spring 350 applies a rearwardly directed biasing force to needle holder 352 and needle 334, and is pressed by spring 350 into facing and abutting contact with the front surface of annular fluid seal 60, thereby establishing a coaxially aligned fluid path through needle 334, needle holder 352 and fluid seal 360 into fluid chamber 375 (visible in FIG. 19) of barrel 322. As shown in FIGS. 14 and 15, plunger seal 376 is pushed fully forward into substantially cylindrical fluid chamber 375 of barrel 322.

Figure 18:
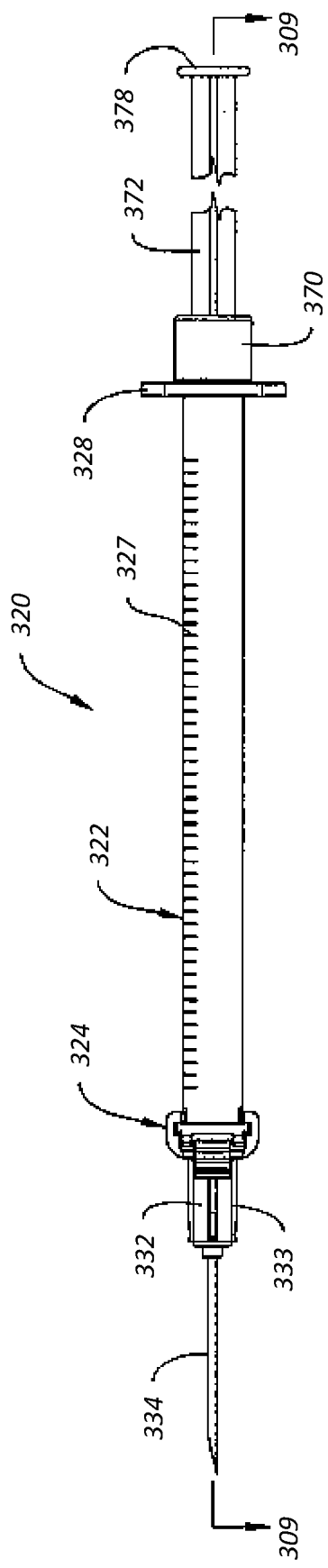
FIG. 18 is a right side elevation view of the embodiment of FIG. 14 with a plunger cap removed and with a plunger withdrawn to an aspirated position.

Referring to FIGS. 18-19, syringe 320 is configured so that fluid can be aspirated into the syringe, with textured touch pad 46 again in the same initial position as previously described. Plunger cap 330 (as seen in FIGS. 12, 14-15) is removed and plunger handle 372 is withdrawn as it would be while aspirating fluid into fluid chamber 375. In FIG. 19 it is seen that needle retraction cavity 392 is substantially coextensive in length with fluid chamber 375, thereby facilitating the placement of volumetric measuring indicia 327 on substantially flat surface 323 (visible in FIG. 13) that facilitates full utilization of the volume of fluid chamber 375 and also facilitating the retraction of needles such as biopsy needles that are often substantially longer than needle 334 (visible inside needle retraction cavity 392 in FIG. 21 below). Once fluid is aspirated into fluid chamber 375, fluid can also be injected into a patient or expelled from fluid chamber 375 by pressing forwardly on plunger thumb pad 378 while applying finger pressure against the forwardly facing side of flange 328.

Figure 23:
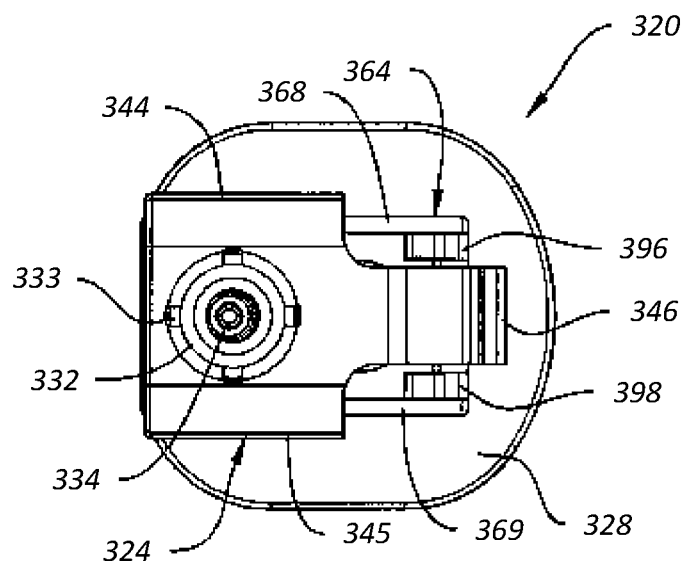
FIG. 23 is a front elevation view of the embodiment of FIG. 22 with a frontal attachment repositioned relative to a barrel and with a needle retracted to the position shown in FIGS. 20 and 21.

Referring to FIGS. 20-21, and 23, plunger handle 372 and plunger seal 376 have been pushed forwardly to empty fluid chamber 375. To initiate needle retraction, pressure is applied to textured touch pad 346, which moves frontal attachment to a position where needle support member 332 is aligned with needle retraction cavity 392. Because needle retraction chamber 392 has a front opening that is larger than head 356 of repositioned needle holder 352, the biasing force of compressed spring 352 pushes needle holder 352 rearwardly and causes needle holder 352 and needle 334 to be propelled into the distal end of needle retraction cavity 392.

Referring again to FIGS. 16 and 17, the further application of force to textured touch surface 346 of frontal attachment 324 relative to barrel 322 as described above in relation to FIGS. 20-21 produces sliding relative movement between frontal attachment 324 and front portion 364 of barrel 322. This movement causes upper ramp 404 and lower ramp 406 to slide over the second set of opposed ramps and blocking shoulders 379 so that top and bottom blocking shoulders 408, 410 are placed in facing and abutting contact with upper and lower blocking shoulders 379, thereby preventing frontal attachment 324 from being returned to the use position relative to barrel 322.

Figure 24:
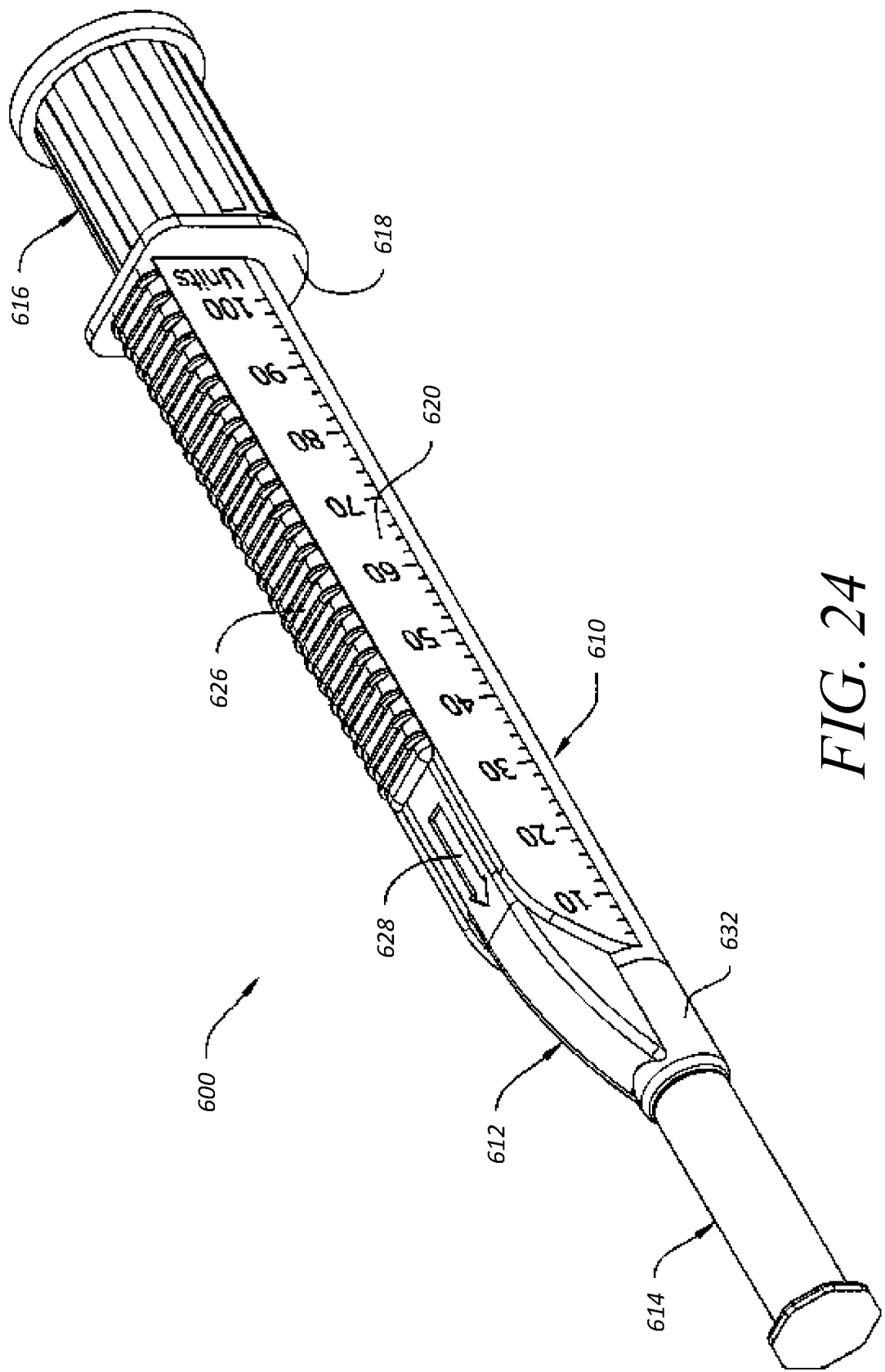
FIG. 24 is a top front perspective view of a medical syringe according to an embodiment herein with a needle safety device.
Figure 25:
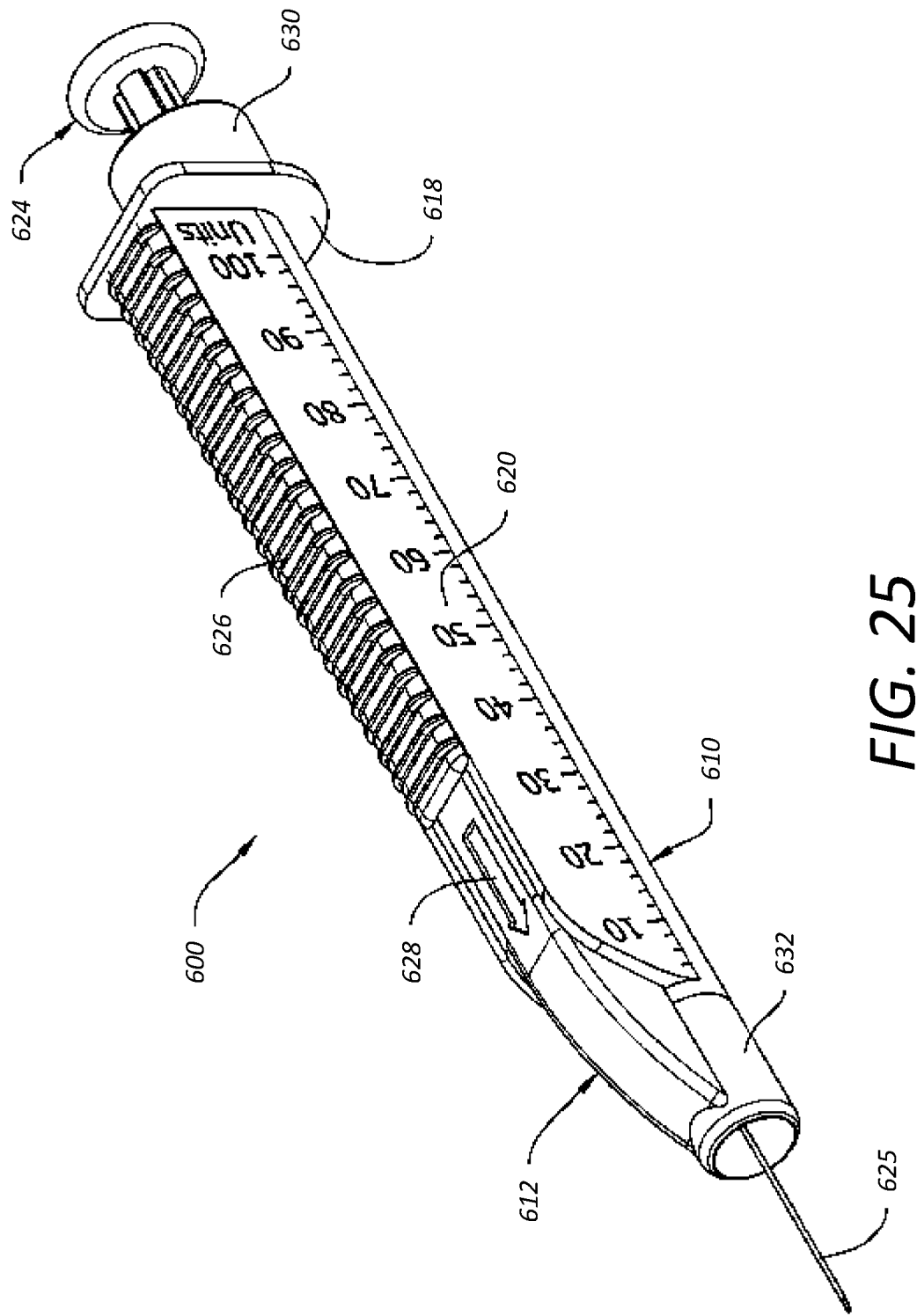
FIG. 25 is the syringe embodiment as shown in FIG. 24 with the needle cap and plunger cap having been removed.
Figure 26:
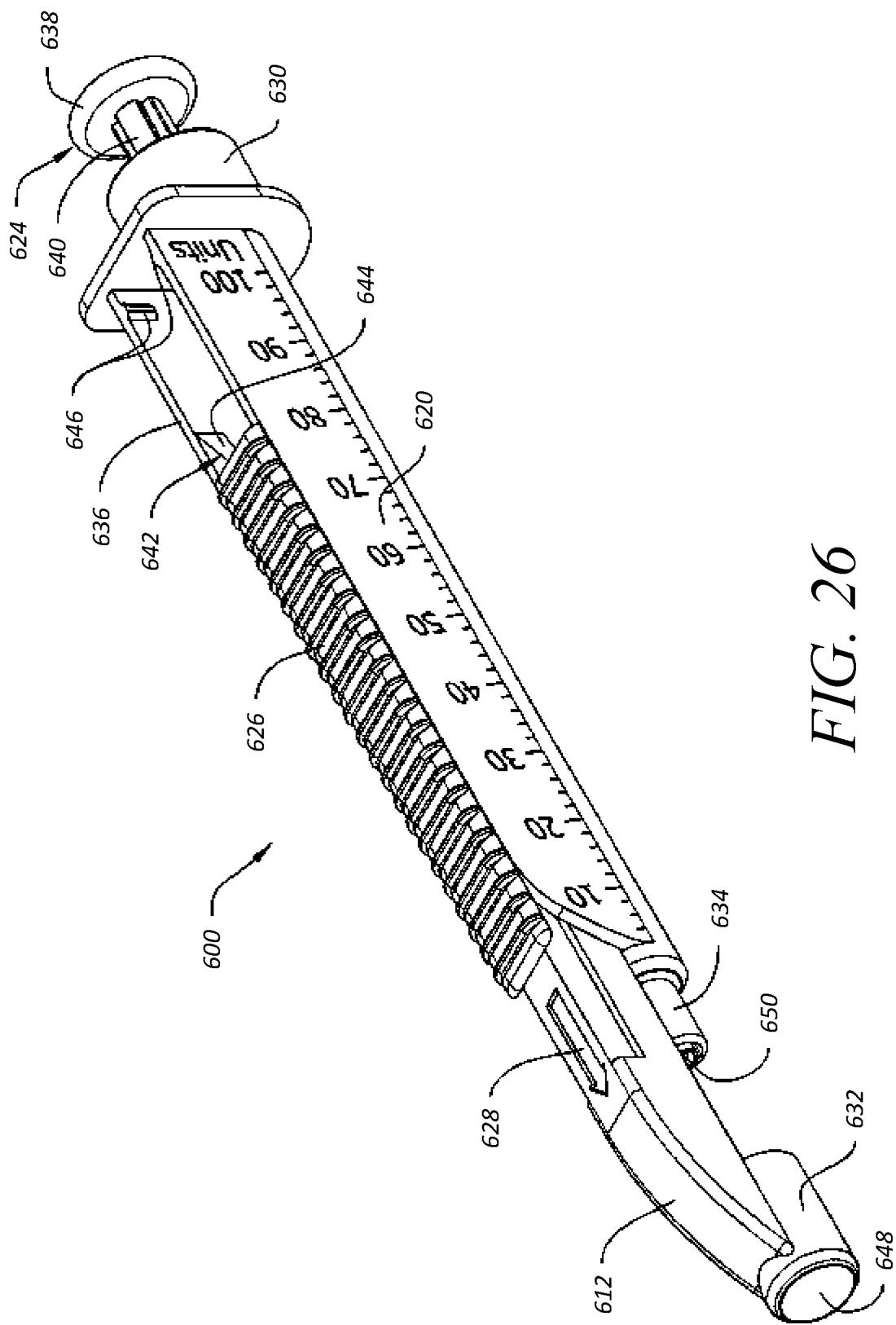
FIG. 26 is the syringe embodiment as shown in FIG. 25 with the needle safety device moved forwardly relative to a barrel and needle, and with a needle tip shield surrounding and covering a needle tip.

Referring to FIGS. 24-34 generally, and specifically to FIGS. 24-27, a syringe 600 is shown according to an embodiment herein. Syringe 600 is shown with a needle safety device 612. Syringe 600 may comprise barrel 610, needle safety device 612, needle cap 614, and plunger cap 616. In FIG. 24, syringe 600 is shown with both a needle cap 614 and a plunger cap 616 in place as they would be when syringe 600 is first removed from its packaging. Barrel 610 comprises at least one longitudinally extending, substantially flat indicia display surface 620 marked with an easily readable volumetric scale. In one embodiment, barrel 610 comprises two oppositely facing, substantially flat indicia display surfaces 620, 636 (FIG. 26). Following removal of needle cap 614 and plunger cap 616 (FIG. 24) from the device, forwardly projecting needle 625 and rearwardly projecting plunger 624 (FIG. 25) become visible. Needle 625 is coaxially aligned with plunger 624 and is held in fixed relation to a narrow bore 650 inside nose 634 (FIGS. 26, 27, 30) at the front end of barrel 610. (Alternatively, it will be appreciated that needle 625 and nose 634 can be cooperatively configured so that needle 625 is releasably attachable to nose 634 if desired to permit the use of differently sized needles with barrel 634.)

Bore 650 places needle 625 in fluid communication with a fluid reservoir disposed inside tubular barrel 658 between nose 634 and plunger seal 660 on the front end of plunger handle 640. When plunger handle 640 is pushed fully forward against the rear of nose 634 of barrel 610 prior to an injection (FIG. 30) or following an injection (FIG. 33) the fluid chamber is not visible. When syringe 600 is prepared for an injection, as discussed below, the fluid reservoir is the space (not visible in these views) inside tubular section 658 that is between the rear of nose 634 and the front of plunger seal 660 as fluid is drawn into syringe 600.

Figure 27:
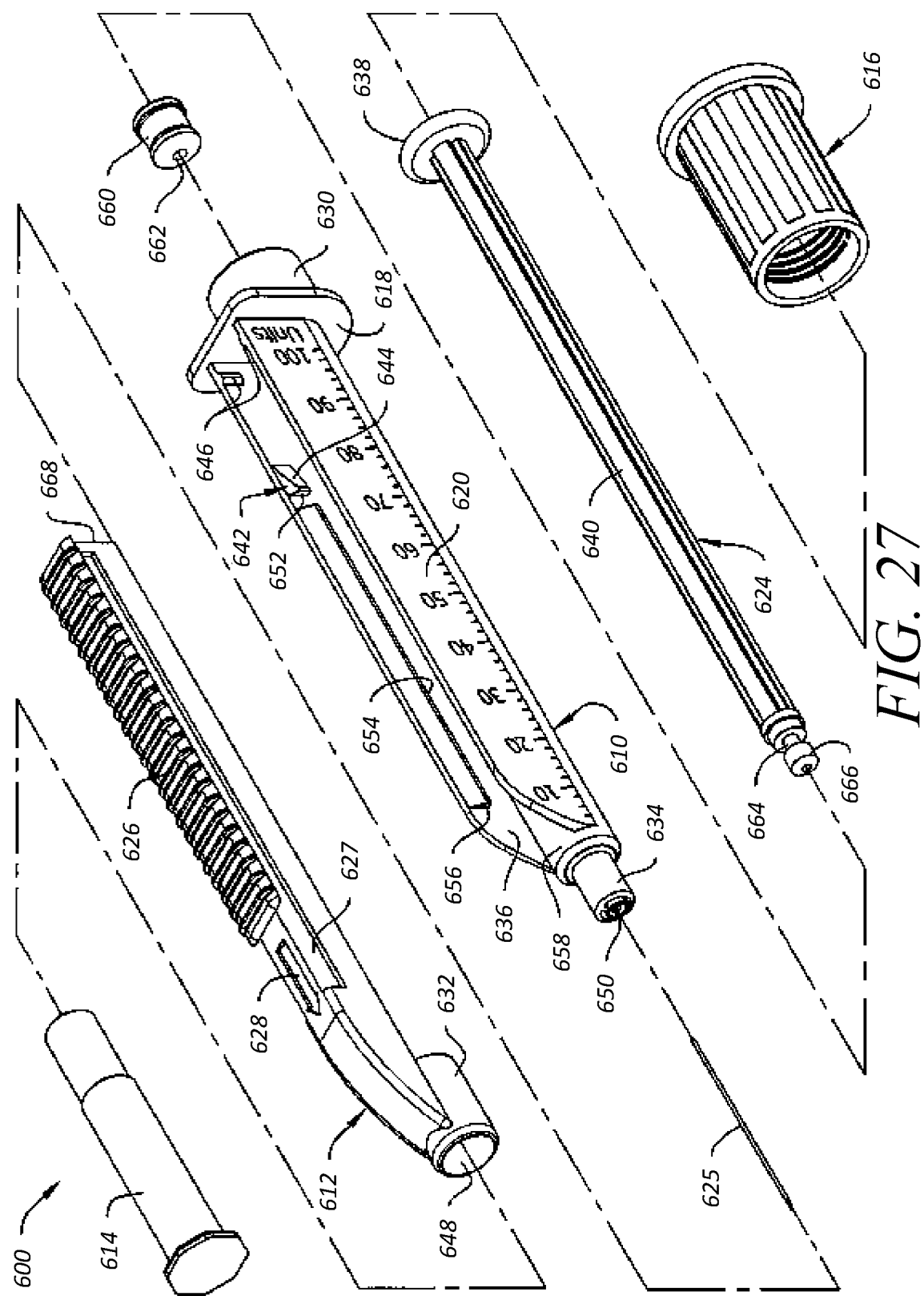
FIG. 27 is an exploded top perspective view of the syringe embodiment of FIG. 24.

Referring to FIG. 27, needle safety device 612 also comprises activation handle 628 and needle tip shield 632. Activation handle 628 further comprises rear end 668, touch pad 626 and a pair of longitudinally extending channels 627 disposed on opposite sides of activation handle 628. The function of channels 627 is discussed below in relation to sliding engagement with barrel 610. Needle tip shield 632 further comprises inside bore 648 that is coaxially aligned with needle 625 and with nose 634 of barrel 610. Needle tip shield 632 has an inside diameter that will allow needle tip shield 632 to slide over and surround coaxially aligned nose 634 when in the position shown in FIGS. 25, 31 and needle tip shield 632 is sufficiently long to safely cover the tip end of needle 625 when moved forwardly as in FIGS. 26, 32-33. Slight frictional engagement can be provided between the inside wall of needle tip shield 632 and nose 634 to help hold needle safety device 612 in a stable axial position relative to barrel 610 during use of syringe 600. Needle safety device 612 is unitarily molded from a polymeric material and is cooperatively sized and configured to slidably engage barrel 610, also taking into consideration the range of needle lengths intended for use with syringe 600. In one embodiment, needle safety device 612 is made of a brightly colored (e.g., red) material to emphasize its presence and its state of use to a user.

Referring again to FIG. 27, barrel 610 further comprises coaxially aligned nose 634 with internal bore 650 and tubular section 658 extending rearwardly from nose 634 to fingertip flange 618. The rear end of tubular section 658 is open and communicates with the inside of cylindrical, rearwardly extending collar 630 to which plunger cap 616 is releasably attachable. Opposed indicia display surfaces 620, 636 (FIG. 26) are parallel, longitudinally extending, substantially flat, printable surfaces each having an oppositely facing volumetric scale comprising appropriate indicia located adjacent to tubular section 658 to facilitate easy reading of a liquid level inside tubular section 658 by a user.

A longitudinally extending rail 656 with an inwardly projecting retainer edge 654 is provided on the inwardly facing walls of each of the outwardly facing indicia display surfaces 620, 636. Longitudinally extending rails 656 are cooperatively sized and configured to engage and provide a smooth, slidable interface along each of aligned channels 627 of needle safety device 612. Barrel 610 is molded from a medical grade polymeric material and is sufficiently transparent to permit the liquid level drawn into tubular section 658 of syringe 600 to be plainly viewed by a user. Still referring to FIG. 27, plunger 624 further comprises thumb cap 638, plunger handle 640, plunger seal retainer body 666 and annular recess 664.

The cooperatively configured structural elements and operation of needle safety device 612 relative to barrel 610 of syringe 600 are further described and explained in relation to FIGS. 25-27, 30, 32-33. During assembly of syringe 600, activation handle 628 of needle safety device 612 is aligned with and inserted over tubular section 658 of barrel 610 with rails 656 engaging channels 627. Needle safety device 612 is moved rearwardly relative to barrel 610 until needle tip shield 632 surrounds nose 634 of barrel 610 and rear end 668 of needle safety device 612 frictionally engages oppositely disposed rear stops 646. Slide stops 642 each having a ramp 644 and stop shoulder 652 are provided rearwardly of rails 656 and forwardly of rear stops 646. Opposed and facing ramps 644 allow activation handle 628 to slide forwardly relative to barrel 610 to a point where needle tip shield 632 covers and protects the tip end of needle 625 following use of syringe 610. After the tip end of needle 625 is covered, opposed and facing stop shoulders 652 prevent activation handle 628 from being moved rearwardly relative to barrel 610 to again expose the needle tip.

Figure 30:
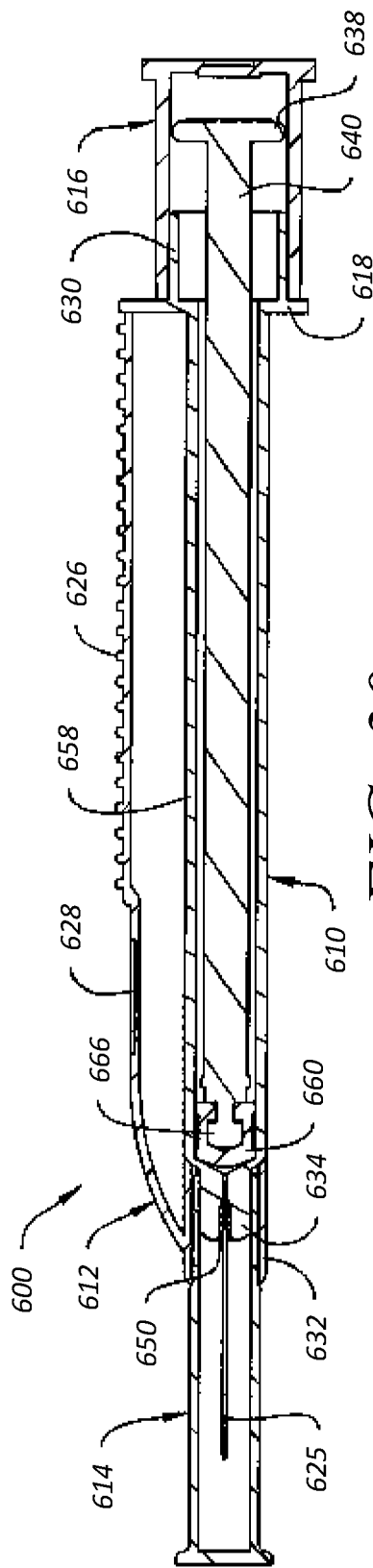
FIG. 30 is a cross-sectional view taken along line 420-420 of FIG. 29.
Figure 31:
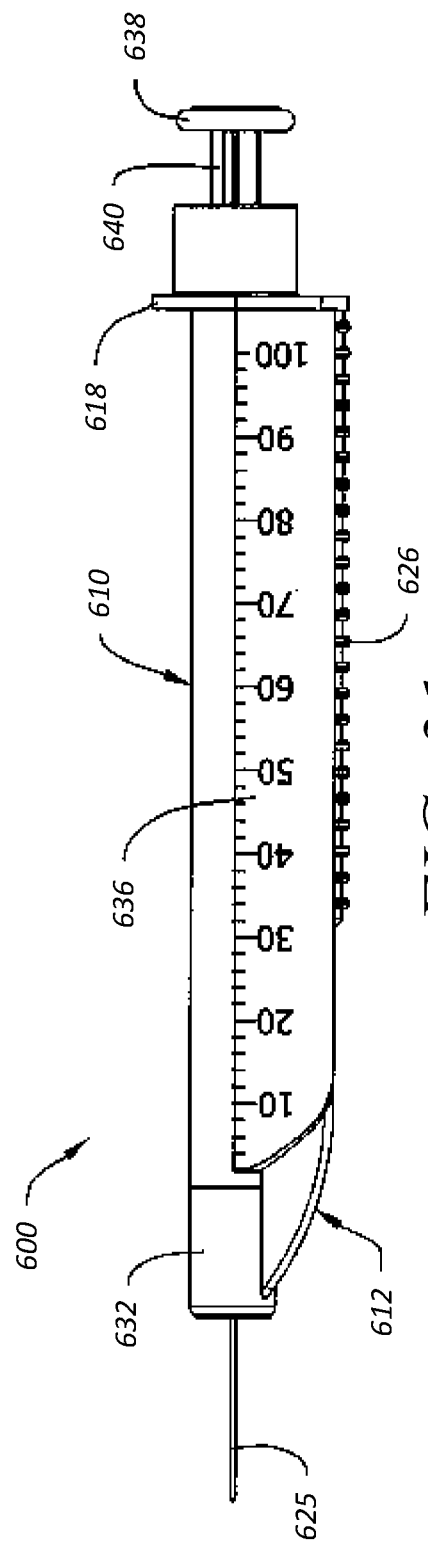
FIG. 31 is the opposite side elevation view of the syringe embodiment as in FIG. 25 but rotated 180° around a longitudinal axis.

When needle safety device 612 and needle tip shield 632 are disposed in the position shown in FIGS. 25, 30-31 (referred to as the "first stop position") relative to barrel 610 and needle 625, needle tip shield 632 surrounds nose 634 of barrel and a portion of needle 625. When needle safety device 612 of syringe 600 is in the first stop position, the front tip of needle 625 can be inserted through the stopper of a medicine vial (e.g., an insulin bottle) and medicine can be drawn into a fluid reservoir disposed inside tubular section 658 (FIGS. 27, 30) of barrel 610 by pulling rearwardly on plunger 624 that slidably engages the inside wall of tubular section 658.

Figure 32:
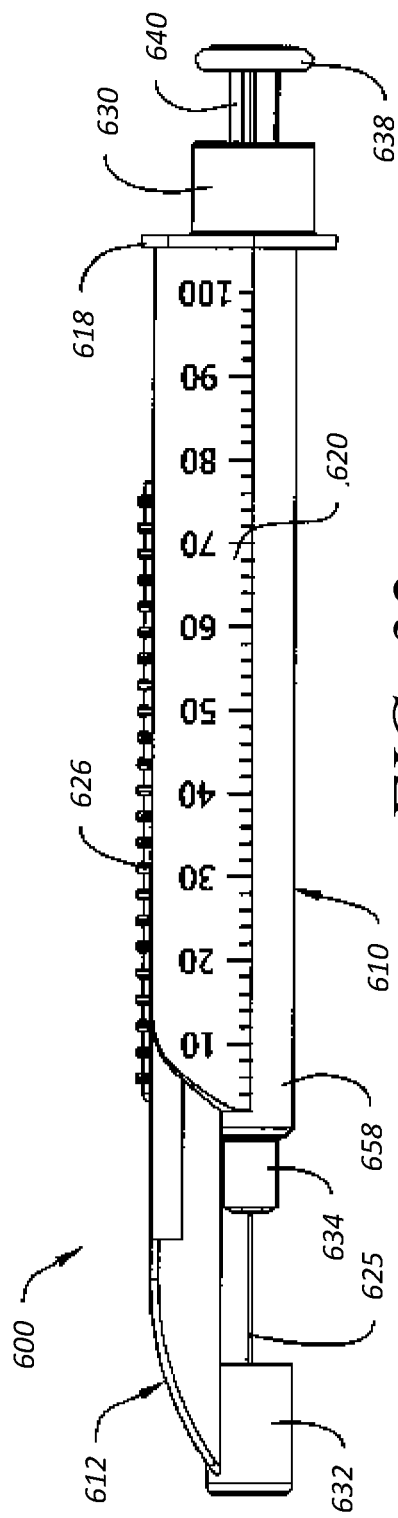
FIG. 32 is a side elevation view of the syringe embodiment as in FIG. 26.
Figure 33:
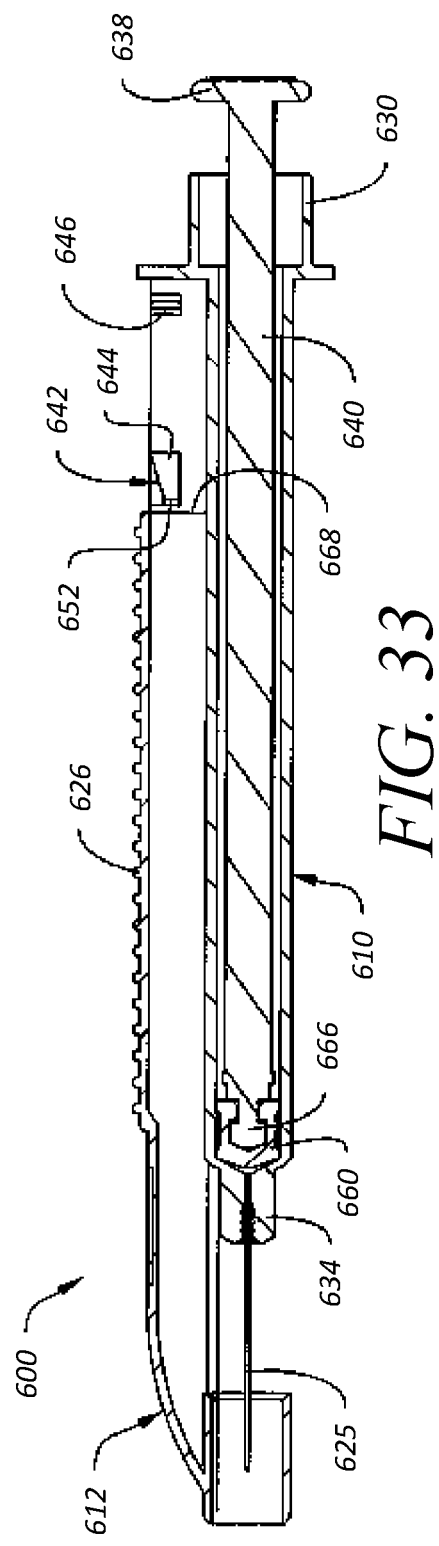
FIG. 33 is a cross-sectional side elevation view taken along the longitudinal axis of a needle of the syringe embodiment as in FIG. 32.
Figure 34:
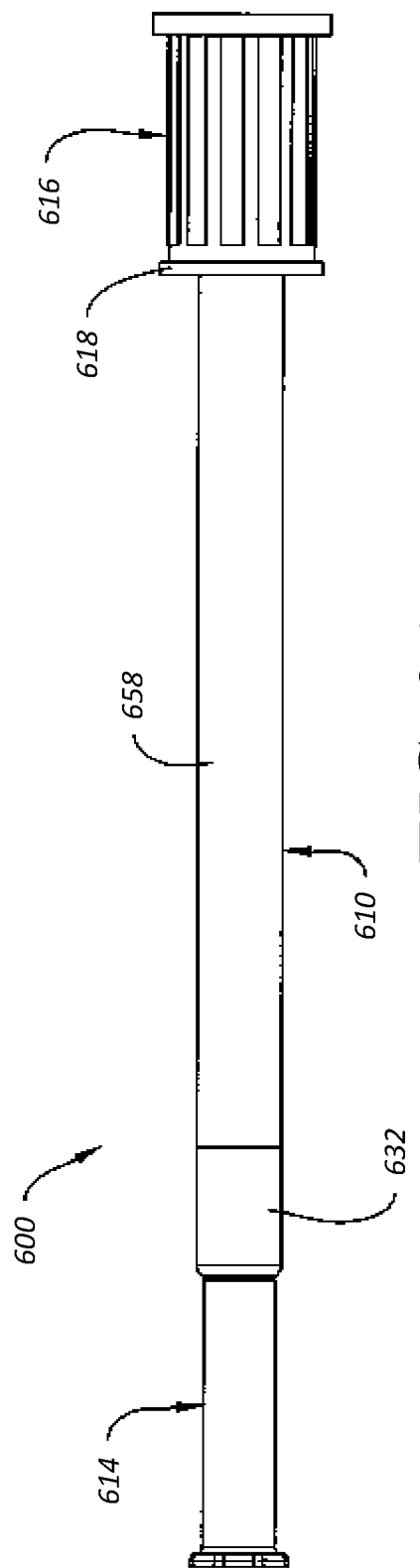
FIG. 34 is a bottom plan view of the syringe embodiment as in FIG. 28.

Following an injection or other use of syringe 600, syringe 600 can be reconfigured into a "safe" position with the needle tip covered and protected from inadvertent contact with a health care professional or patient by selectively moving needle safety device 612 forwardly to the position shown in FIGS. 26, 32-33, which is the "second stop position." When syringe 600 is configured with needle safety device 612 in the second stop position, the front tip of needle 625 is circumferentially surrounded by needle tip shield 632 and (as shown in FIGS. 26, 33) the front end of needle tip shield 632 extends sufficiently forward of the tip end of needle 625 that an individual will not receive an unintended needle stick if the front end of syringe 600 is pressed against his or her skin.

In various embodiments herein, an imaging device or camera may be used to capture an image of a syringe with a drawn dose without requiring a fixed staging area for the syringe or stand for the camera to hold the camera a fixed or selected distance above, or angle with respect to, the syringe. Additionally, no particular geometry or markings are required for a surface on which a syringe with a drawn dose rests for capturing an image. A generally flat surface, such as a tabletop, is sufficient. A syringe to be imaged for dosage verification may also be held in a user's hand, with the imaging device held in the other hand. Images may be acquired to verify dosage amounts without needing particular or specialized lighting, such as colored lighting or lighting of a particular wavelength, or particular or specialized camera filters, such as polarization filters. Sufficient images may be captured using ambient lighting or a built-in flashlight on a cellular telephone and using only the camera hardware typically included in off-the-shelf smart phones.

Embodiments described herein with respect to a drawn dosage in a syringe may also apply to a pre-filled dosage. Although pre-filled dosages are generally accurate, it may be desirable to utilize a dosage verification system or method according to embodiments herein to verify that the pre-filled dosage is accurate and/or to verify that the particular pre-filled syringe selected for injection or administration is the correct syringe based on the prescribed dosage or medical data of the patient (for example, to detect if the user mistakenly selected a 1 mL pre-filled syringe when the prescribed dosage is 2 mL and a 2 mL pre-filled syringe should have been selected). In such embodiments, a syringe comprising a pre-filled dosage may not comprise a needle but may be configured to have a needle attached to the syringe in various methods disclosed herein or others known in the art.

Ancillary components of a dosage verification system and method according to various embodiments herein may include a digital processor, digital storage media, report generation software, and radio frequency, Bluetooth, and/or Wi-Fi transmitters.

It will be appreciated that systems and methods disclosed herein may include one or more of the following Embodiments, either alone or in combination with other Embodiments:

Embodiment 1. A syringe for verification of a volume of a medicinal fluid drawn into the syringe, the syringe comprising: a barrel; a fluid chamber disposed inside the barrel and configured to receive the volume of the medicinal fluid in the syringe; and a plunger slidably engaging the fluid chamber; wherein a first portion of the syringe has a first element; wherein a second portion of the syringe has a second element; and wherein the first element and the second element are distinguishable by a processor from other portions of the syringe in a digital image of at least a portion of the syringe to determine a position of the plunger relative to the barrel that indicates the volume of the medicinal fluid drawn into the syringe.

Embodiment 2. The syringe of embodiment 1, wherein there are no volumetric markings on the barrel.

Embodiment 3. The syringe of embodiment 2, wherein there are no volumetric markings on the plunger.

Embodiment 4. The syringe of embodiment 1, wherein the first element and the second element are RGB elements.

Embodiment 5. The syringe of embodiment 4, wherein the first element and the second element are contrasting from other portions of the syringe.

Embodiment 6. The syringe of embodiment 1, wherein the first element is a first color, and wherein the second element is a second color.

Embodiment 7. The syringe of embodiment 6, wherein the first color is contrasting with the second color.

Embodiment 8. The syringe of embodiment 6, wherein the first color and the second color are contrasting from other portions of the syringe.

Embodiment 9. The syringe of embodiment 6, wherein the first color and the second color are substantially identical.

Embodiment 10. The syringe of embodiment 9, wherein the first color is red.

Embodiment 11. The syringe of embodiment 9, wherein the first color is orange.

Embodiment 12. The syringe of embodiment 6, wherein the first color is different from the second color.

Embodiment 13. The syringe of embodiment 12, wherein one of the first color and the second color is orange.

Embodiment 14. The syringe of embodiment 12, wherein the other of the first color or the second color is blue.

Embodiment 15. The syringe of embodiment 1, wherein the barrel is non-transparent.

Embodiment 16. The syringe of embodiment 15, wherein there are no volumetric markings on the barrel.

Embodiment 17. The syringe of embodiment 1, wherein the first portion comprises a forward end of the barrel and the second portion is disposed at a rear end of the barrel.

Embodiment 18. The syringe of embodiment 1, further comprising: a first wall extending laterally from the barrel; a second wall extending laterally from the barrel and parallel to the first wall; a channel formed between the first wall and the second wall; and a needle safety device comprising: an activation handle at least partially disposed in the channel and configured to slide from a first rearward position to a second forward position; and a needle tip shield connected to the activation handle; wherein the needle tip shield surrounds a nose of the barrel when the activation handle in the first rearward position and surrounds a front tip of a needle connected to the nose when the activation handle is in the second forward position; and wherein the second portion is a rear portion of the activation handle.

Embodiment 19. The syringe of embodiment 18, wherein at least one of the first wall or the second wall comprises a substantially flat outer surface to allow the syringe to lie on a surface without rolling.

Embodiment 20. The syringe of embodiment 19, further comprising: a plurality of volumetric markings disposed on the substantially flat outer surface and adjacent to the barrel.

Embodiment 21. The syringe of embodiment 20, wherein the barrel is sufficiently transparent to allow the medicinal fluid to be viewed through the barrel.

Embodiment 22. The syringe of embodiment 1, wherein the barrel is colored in a partially transparent gradient scale.

Embodiment 23. The syringe of embodiment 22, wherein the barrel is grayscale.

Embodiment 24. The syringe of embodiment 1, wherein a first portion of an external surface of the barrel is textured to diffuse light refraction.

Embodiment 25. The syringe of embodiment 1, further comprising: a substantially flat wall extending laterally from the barrel; and a plurality of volumetric markings disposed on the substantially flat wall.

Embodiment 26. The syringe of embodiment 25, wherein the substantially flat wall comprises a textured surface to enhance adhesion of at least one of the volumetric markings and a sticker.

Embodiment 27. The syringe of embodiment 26, wherein the sticker is printed with at least one of descriptive information regarding the medicinal fluid, a QR code to access the descriptive information regarding the medicinal fluid, and pharmacy information.

Embodiment 28. The syringe of embodiment 25, wherein the substantially flat wall is textured using laser etching.

Embodiment 29. The syringe of embodiment 25, wherein the plurality of volumetric markings aid in orienting a needle during manufacture.

Embodiment 30. The syringe of embodiment 25, wherein at least a portion of the barrel comprises a textured external surface to diffuse light refraction.

Embodiment 31. The syringe of embodiment 30, wherein the substantially flat wall has substantially no texture other than the plurality of volumetric markings.

Embodiment 32. The syringe of embodiment 1, wherein at least a portion of the syringe comprises a textured surface to diffuse light refraction.

Embodiment 33. The syringe of embodiment 1, further comprising: a laterally offset needle retraction cavity integrally molded and substantially coextensive longitudinally with the barrel and separated from the fluid chamber by a common wall; and a frontal attachment slidably engaging a front portion of the barrel in a direction transverse to a longitudinal axis of the plunger, with a forwardly projecting, rearwardly biased needle seated therein, the needle being selectively retractable into the needle retraction cavity following use.

Embodiment 34. The syringe of embodiment 1, wherein there is no electronic circuitry within the syringe.

Embodiment 35. A system for verifying dosage accuracy of a medicinal fluid, the system comprising: a syringe comprising a barrel, a fluid chamber disposed inside the barrel, a plunger slidably engaging the fluid chamber, and a needle, the syringe configured to draw an actual dosage of the medicinal fluid into the fluid chamber by movement of the plunger rearwardly in the fluid chamber; and a first data set comprising pre-determined volumetric proportions of the fluid chamber between a substantially full volume when the plunger is in a fully extended position relative to the barrel and a substantially empty volume when the plunger is in a fully inserted position relative to the barrel, the first data set configured to be saved to a processor or accessed by the processor for use in a software application to determine a volume of the actual dosage based on a digital image of at least a portion of the syringe after the actual dosage is drawn into the fluid chamber and a position of the plunger relative to the barrel is between the fully extended position and the fully inserted position.

Embodiment 36. The system of embodiment 35, wherein the barrel is non-transparent.

Embodiment 37. The system of embodiment 36, wherein there are no volumetric markings on the barrel.

Embodiment 38. The system of embodiment 36, wherein at least a rear portion of the barrel has a first color, wherein a rear portion of the plunger is disposed rearwardly of the barrel when the plunger is in the fully inserted position, and wherein the rear portion of the plunger has a second color that contrasts with the first color.

Embodiment 39. The system of embodiment 38, further comprising: a second data set, the second data set comprising a predetermined dosage volume based on at least one of medicine records, medical histories, insurance reporting, billing, a biometric reading, and prescriptions, the second data set configured to be saved to the processor or accessed by the processor for use in a software application to compare to the volume of the actual dosage to determine the accuracy of the actual dosage.

Embodiment 40. The system of embodiment 39, wherein the biometric reading is a blood glucose level.

Embodiment 41. The system of embodiment 35, wherein a first portion of the syringe has a first color, wherein a second portion of the syringe has a second color, and wherein the first color and the second color in the digital image are distinguishable by the processor from other portions of the syringe to determine the position of the plunger.

Embodiment 42. The system of embodiment 41, wherein the first color is red.

Embodiment 43. The system of embodiment 41, wherein the first portion is disposed on or near a forward end of the barrel and the second portion is disposed on or near a rearward end of the barrel.

Embodiment 44. The system of embodiment 43, wherein the barrel is sufficiently transparent to allow the medicinal fluid in the fluid chamber to be viewed through the barrel.

Embodiment 45. The system of embodiment 44, wherein the barrel is colored in a partially transparent gradient scale.

Embodiment 46. The system of embodiment 45, wherein the barrel is grayscale.

Embodiment 47. The system of embodiment 44, wherein the syringe further comprises a plurality of volumetric markings disposed on an outer surface of the barrel.

Embodiment 48. The system of embodiment 47, wherein the syringe comprises: a first wall extending laterally from the barrel; a second wall extending laterally from the barrel and parallel to the first wall; a channel formed between the first wall and the second wall; and a needle safety device comprising: an activation handle at least partially disposed in the channel and configured to slide from a first rearward position to a second forward position; and a needle tip shield connected to the activation handle; wherein the needle tip shield surrounds a nose of the barrel when the activation handle in the first rearward position and surrounds a front tip of the needle connected to the nose when the activation handle is in the second forward position; and wherein the second portion is a rear portion of the activation handle.

Embodiment 49. The system of embodiment 43, further comprising: a second data set, the second data set comprising a predetermined dosage volume based on at least one of medicine records, medical histories, insurance reporting, billing, a biometric reading, and prescriptions, the second data set configured to be saved to the processor or accessed by the processor for use in a software application to compare to the volume of the actual dosage to determine the accuracy of the actual dosage.

Embodiment 50. The system of embodiment 49, wherein the biometric reading is a blood glucose level.

Embodiment 51. The system of embodiment 50, wherein the first color is orange.

Embodiment 52. The system of embodiment 51, wherein the second color is orange.

Embodiment 53. The system of embodiment 50, wherein one of the first color and the second color is orange and the other of the first color and the second color is blue.

Embodiment 54. The system of embodiment 49, wherein the first color and the second color are substantially identical.

Embodiment 55. The system of embodiment 43, wherein the first color is orange.

Embodiment 56. The system of embodiment 43, wherein the second color is orange.

Embodiment 57. The system of embodiment 43, wherein one of the first color and the second color is orange and the other of the first color and the second color is blue.

Embodiment 58. The system of embodiment 43, wherein the first color and the second color are substantially identical.

Embodiment 59. The system of embodiment 35, further comprising: a laterally offset needle retraction cavity integrally molded and substantially coextensive longitudinally with the barrel and separated from the fluid chamber by a common wall; and a frontal attachment slidably engaging a front portion of the barrel in a direction transverse to a longitudinal axis of the plunger, with the needle seated therein being forwardly projecting, rearwardly biased, and selectively retractable into the needle retraction cavity following use.

Embodiment 60. A method of verifying a dosage accuracy of a medicinal fluid, the method comprising: drawing an actual dosage of the medicinal fluid into a fluid chamber of a barrel of a syringe, a plunger slidably engaging the barrel, and a hypodermic needle; positioning a digital imaging device relative to the syringe, wherein the digital imaging device comprises a camera, a processor, and a software application executed by the processor, configured to selectively view, capture, and store a digital image of the syringe; capturing the digital image of the syringe; and processing the digital image to determine a volume of the actual dosage of the medicinal fluid based on a position of the plunger relative to the barrel and pre-determined volumetric proportions of the fluid chamber between a substantially full volume when the plunger is in a fully extended position relative to the barrel and a substantially empty volume with the plunger is a fully inserted position relative to the barrel.

Embodiment 61. The method of embodiment 60, wherein the digital imaging device is a handheld device.

Embodiment 62. The method of embodiment 60, wherein the digital imaging device is a cell phone.

Embodiment 63. The method of embodiment 60, wherein the plunger comprises a plunger seal disposed at a forward end and wherein the processing is based on the position of the plunger seal inside the fluid chamber.

Embodiment 64. The method of embodiment 60, wherein the barrel is not transparent.

Embodiment 65. The method of embodiment 60, wherein the plunger comprises a plunger cap disposed at a rearward end and wherein the processing is based on the position of the plunger cap outside the fluid chamber.

Embodiment 66. The method of embodiment 64, wherein a rear portion of the plunger is disposed rearwardly of the barrel when the plunger is in the fully inserted position and wherein the processing is based on the position of the rear portion of the plunger.

Embodiment 67. The method of embodiment 60, further comprising generating an alert to notify a user if the digital image of the syringe has been stored.

Embodiment 68. The method of embodiment 67, wherein the alert is at least one of an audible alert, a visual alert, and a tactile alert.

Embodiment 69. The method of embodiment 60, further comprising: comparing the actual dosage from the processing with a predetermined dosage of the medicinal fluid; and generating an alert to notify a user if the actual dosage is above or below the predetermined dosage.

Embodiment 70. The method of embodiment 69, wherein the predetermined dosage is determined by cross-matching at least one of (1) the actual dosage, a name of the medicinal fluid, or information identifying a patient to receive the actual dosage against at least one of (2) medicine records, medical histories, insurance reporting, billing, and prescriptions.

Embodiment 71. The method of embodiment 69, wherein the generating generates a first alert to notify the user if the actual dosage is above the predetermined dosage and generates a second alert to notify the user if the actual dosage is below the predetermined dosage; wherein the first alert is distinguishable from the second alert.

Embodiment 72. The method of embodiment 60, wherein the syringe does not have any external volumetric markings.

Embodiment 73. The method of embodiment 60, wherein at least a portion of the plunger is colored differently from at least a portion of the barrel.

Embodiment 74. The method of embodiment 60, wherein the plunger has a first color, and the barrel has a second color different from the first color.

Embodiment 75. The method of embodiment 74, wherein the first color and the second color are contrasting.

Embodiment 76. The method of embodiment 60, wherein a first portion of the syringe has a first RGB element that is distinguishable from other portions of the syringe; wherein the position of the plunger relative to the barrel is determined at least in part by distinguishing the first RGB element from the other portions of the syringe.

Embodiment 77. The method of embodiment 76, wherein the barrel further comprises a plurality of volumetric markings and wherein the digital image includes the plurality of volumetric markings.

Embodiment 78. The method of embodiment 77, wherein the plurality of volumetric markings are not used in the processing to determine the volume of the actual dosage.

Embodiment 79. The method of embodiment 77, wherein the first RGB element comprises the plurality of volumetric markings and the plurality of markings is used in the processing to determine the volume of the actual dosage.

Embodiment 80. The method of embodiment 76, wherein a second portion of the syringe has a second RGB element.

Embodiment 81. The method of embodiment 80, wherein the first portion of the syringe is disposed at or near a forward end of the barrel and the second portion of the syringe is disposed at or near a rear end of the barrel.

Embodiment 82. The method of embodiment 81, wherein the first RGB element is a first color and the second RGB element is a second color that is substantially different from the first color.

Embodiment 83. The method of embodiment 81, wherein the first RGB element is substantially identical to the second RBG element.

Embodiment 84. The method of embodiment 60, wherein the barrel is colored in a partially transparent gradient scale.

Embodiment 85. The method of embodiment 60, wherein the barrel is grayscale.

Embodiment 86. A method for injecting a verified dosage of a medicinal fluid, the method comprising: providing a syringe having a non-transparent barrel, a fluid chamber disposed inside the barrel, and a plunger slidably engaging the barrel; providing a digital imaging device configured to selectively view, capture, and store a digital image of the syringe; drawing a dosage of the medicinal fluid into the fluid chamber; positioning the digital imaging device relative to the syringe; capturing and storing a digital image of the syringe and the medicinal fluid drawn into the fluid chamber; and processing the digital image to determine the drawn dosage of the medicinal fluid.

Embodiment 87. The method of embodiment 86, wherein the imaging device is controlled using application software installed on the imaging device.

Embodiment 88. The method of embodiment 87, wherein the application software is configured to generate an alert to notify a user if the digital image of the syringe has been stored.

Embodiment 89. The method of embodiment 88, wherein the alert is at least one of an audible alert, a visual alert, and a tactile alert.

Embodiment 90. The method of embodiment 87, wherein the application software is configured to notify a user if an incorrect fluid dosage has been drawn into the syringe.

Embodiment 91. The method of embodiment 90, wherein the incorrect fluid dosage is determined by cross-matching the drawn dosage against at least one of medicine records, medical histories, insurance reporting, and billing.

Embodiment 92. The method of embodiment 86, wherein at least one of a comparator and a digital signal processor perform the processing.

Embodiment 93. The method of embodiment 86, wherein the processing is configured to determine the drawn dosage from a digital image of a plunger handle position relative to the barrel.

Embodiment 94. The method of embodiment 86, wherein the processing is configured to determine the drawn dosage from a digital image of numerical indicia on the barrel.

Embodiment 95. The method of embodiment 86, wherein the processing is configured to determine the drawn dosage from a plurality of digital images.

Embodiment 96. A system for verifying dosage accuracy of a medicinal fluid, the system comprising: a syringe having a barrel and a plunger slidably engaging a fluid chamber inside the barrel, the syringe configured to draw an actual dosage of the medicinal fluid into the fluid chamber by movement of the plunger rearwardly in the fluid chamber; and an imaging device configured to selectively capture at least one digital image of a portion of the syringe and a processor executing a software application to determine a volume of the actual dosage of the medicinal fluid based on the at least one digital image of the portion of the syringe.

Embodiment 97. The system of embodiment 96, wherein the barrel is non-transparent, and wherein the processor is configured to determine the volume of the actual dosage of the medicinal fluid based on a position of the plunger relative to the barrel and pre-determined volumetric proportions of the fluid chamber between a substantially full volume when the plunger is in a fully extended position relative to the barrel and a substantially empty volume with the plunger is a fully inserted position relative to the barrel.

Embodiment 98. The system of embodiment 97, wherein at least a portion of the plunger is colored differently from at least another portion of the barrel.

Embodiment 99. The system of embodiment 97, wherein the plunger has a first color and the barrel has a second color different from the first color.

Embodiment 100. The system of embodiment 99, wherein the first color and the second color are contrasting.

Embodiment 101. The system of embodiment 98, wherein the portion of the plunger is a plunger cap disposed at a rearward end of the plunger and wherein the processor is configured to determine the actual dosage based on the position of the plunger cap outside the fluid chamber.

Embodiment 102. The system of embodiment 98, wherein the portion of the plunger is disposed rearwardly of the barrel when the plunger is in the fully inserted position and wherein the processor is configured to determine the actual dosage based on the position of the portion of the plunger.

Embodiment 103. The system of embodiment 96, wherein the barrel comprises a set of volumetric markings along a length of the fluid chamber and at least a portion of the barrel adjacent to the set of volumetric markings is sufficiently transparent to allow the actual dosage of the medicinal fluid to be viewable through the portion of the barrel.

Embodiment 104. The system of embodiment 103, wherein the processor is configured to determine the volume of the actual dosage based on the set of volumetric markings and a position of a seal disposed on a forward end of the plunger within the fluid chamber.

Embodiment 105. The system of embodiment 103, wherein the processor is configured to determine the volume of the actual dosage based on the set of volumetric markings and a difference in coloration of the medicinal fluid and the barrel.

Embodiment 106. The system of embodiment 96, wherein the processor is further configured to compare the volume of the actual dosage of the medicinal fluid with a predetermined dosage volume of the medicinal fluid and generate an alert to notify a user a user if the volume of the actual dosage is above or below the predetermined dosage volume.

Embodiment 107. The system of embodiment 106, wherein the predetermined dosage volume is determined by cross-matching at least one of (1) the actual dosage, a name of the medicinal fluid, or information identifying a patient to receive the actual dosage against at least one of (2) medicine records, medical histories, insurance reporting, billing, and prescriptions.

Embodiment 108. The system of embodiment 106, wherein the processor is configured to generate a first alert to notify the user if the volume of the actual dosage is above the predetermined dosage volume and to generate a second alert to notify the user if the volume of the actual dosage is below the predetermined dosage volume, and wherein the first alert is distinguishable from the second alert.

Embodiment 109. The system of embodiment 96, wherein the syringe does not have any external volumetric markings.

Embodiment 110. The system of embodiment 96, wherein the imaging device displays a numerical value of the volume of the actual dosage.

Embodiment 111. The system of embodiment 96, wherein the imaging device appends date and time data to the at least one digital image.

Embodiment 112. The system of embodiment 96, wherein the imaging device is a mobile imaging device.

Embodiment 113. The system of embodiment 112, wherein the mobile imaging device is a cellular telephone.

Embodiment 114. The system of embodiment 112, wherein the mobile imaging device is a digital scanner.

Embodiment 115. The system of embodiment 96, wherein the imaging device is controlled using application software installed on the imaging device.

Embodiment 116. The system of embodiment 115, wherein the application software is configured to generate an alert to notify a user if the at least one digital image of the syringe has been stored.

Embodiment 117. The system of embodiment 96, further comprising: a comparator configured to generate an alert to notify a user of an incorrect fluid dosage drawn into the syringe.

Embodiment 118. The system of embodiment 117, wherein the alert is at least one of an audible alert, a visual alert, and a tactile alert.

Embodiment 119. The system of embodiment 96, wherein the syringe further comprises at least one needle safety feature configured to protect a user or a third party from an accidental needle stick.

Embodiment 120. The system of embodiment 119, wherein the at least one needle safety feature comprises a mechanism that selectively retracts the hypodermic needle following use.

Embodiment 121. The system of embodiment 96, wherein the syringe is free of numerical indicia.

Embodiment 122. The system of embodiment 96, wherein the syringe includes empty and full plunger position indicia.

Embodiment 123. The system of embodiment 96, wherein the syringe is of known rated volumetric capacity.

Embodiment 124. The system of embodiment 96, wherein the imaging device is configured to determine a volumetric dosage from a digital image of a plunger handle position relative to the barrel.

Embodiment 125. The system of embodiment 124, wherein the imaging device determines the volumetric dosage using a plunger position ratio calculation.

Embodiment 126. The system of embodiment 124, wherein the imaging device is configured for use with a syringe having an opaque barrel.

Embodiment 127. The system of embodiment 124, wherein the imaging device is configured for use with a syringe having a translucent barrel.

Embodiment 128. The system of embodiment 96, wherein the imaging device is configured to determine a drawn dosage from a digital image of numerical indicia on the barrel.

Embodiment 129. The system of embodiment 96, wherein the barrel comprises an outwardly facing wall unitarily molded with an inwardly facing wall, the outwardly facing wall having a volumetric scale and numeric indicia disposed on a flat display surface longitudinally coextensive with the fluid chamber so that a full volumetric scale and the numeric indicia are visible in relation to a plunger seal of the plunger.

Embodiment 130. The syringe of embodiment 96, wherein the portion of the syringe comprises a portion of the plunger disposed within the fluid chamber of the barrel and at least a portion of the barrel.

Embodiment 131. The syringe of embodiment 96, wherein the portion of the syringe comprises a plunger seal disposed about the plunger and engaging the fluid chamber of the barrel and at least a portion of the barrel.

Embodiment 132. The syringe of embodiment 96, wherein the portion of the syringe comprises a portion of the plunger extending from the fluid chamber of the barrel and at least a portion of the barrel.

Embodiment 133. A system for injecting a verified dosage of a medicinal fluid, the system comprising: means for injecting the medicinal fluid using a syringe having a non-transparent barrel, a fluid chamber disposed inside the barrel, a plunger slidably engaging the barrel, and a hypodermic needle; means for positioning a digital imaging device relative to the syringe; means for drawing a dosage of the medicinal fluid into the fluid chamber using the plunger; means for viewing and selectively capturing and storing at least one digital image of the syringe and the medicinal fluid drawn into the fluid chamber using the digital imaging device; and means for determining a volumetric dosage of the medicinal fluid by processing the digital image.

Embodiment 134. A method for injecting a verified dosage of a medicinal fluid, the method comprising: providing a syringe having a non-transparent barrel, a fluid chamber disposed inside the barrel, a plunger slidably engaging the barrel, and a hypodermic needle; providing a digital imaging device configured to selectively view, capture, and store a digital image of the syringe; drawing a dosage of the medicinal fluid into the fluid chamber; positioning the digital imaging device relative to the syringe; capturing and storing a digital image of the syringe and the medicinal fluid drawn into the fluid chamber; and processing the digital image to determine the drawn dosage of the medicinal fluid.

Embodiment 135. A non-transitory computer-readable storage medium having embedded therein a set of instructions which, when executed by one or more processors of a computer, causes the computer to execute operations for verifying a dosage of a medicinal fluid drawn into a syringe, the operations comprising: providing a syringe having a non-transparent barrel, a fluid chamber disposed inside the barrel, a plunger slidably engaging the barrel, and a hypodermic needle; providing a digital imaging device configured to selectively view, capture, and store a digital image of the syringe containing a drawn dosage of the medicinal fluid; drawing a dosage of the medicinal fluid into the fluid chamber; positioning the digital imaging device relative to the syringe; capturing and storing the digital image of the syringe and the medicinal fluid drawn into the fluid chamber; and processing the digital image to determine the drawn dosage of medicinal fluid.

This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein.

It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects. Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, may be combined in a single package or separately maintained and may further be distributed in multiple groupings or packages or across multiple locations.

Other alterations and modifications of the disclosure will likewise become apparent to those of ordinary skill in the art upon reading this specification in view of the accompanying drawings, and it is intended that the scope of the disclosure disclosed herein be limited only by the broadest interpretation of the appended claims to which the inventors are legally entitled.

References to front or forward and the like herein generally refer to a direction that would be toward a patient in use of syringe or other medical device herein or from a plunger thumb cap or thumb flange toward a nose of a barrel. References herein to rear or rearward or back or the backward or the like refer to a direction substantially opposite from front or forward or the like.

Any component, feature, or step indicated as preferred or preferable herein may be used alone or in any combination with other preferred or preferable components, features, or steps. Any component, feature, or step described herein with respect to any embodiment may be used with any other embodiment, even if not specifically described with such embodiment, unless it is specifically described as excluded for use with such embodiment.

What is claimed is:

1. A syringe for verification of a volume of a medicinal fluid in the syringe, the syringe comprising:
    a barrel comprising a fluid chamber configured to hold the volume of the medicinal fluid in the syringe; and
    a plunger slidably engaging the fluid chamber;
    wherein the syringe comprises a first component that is a first color, and wherein the first component is the plunger;
    wherein the syringe comprises a second component that is a second color different from the first color, and wherein the second component comprises a needle safety device;
    wherein the first component is movable with respect to the second component, the barrel, or both; and
    wherein the first component and the second component are distinguishable by a processor in a digital image comprising at least a portion of the first component and at least a portion of the second component to determine a position of the first component relative to the second component that indicates the volume of the medicinal fluid in the syringe.

2. The syringe of claim 1, wherein there are no volumetric markings on the barrel, the plunger, or a combination thereof.

3. The syringe of claim 1, wherein an entirety of the first component is the first color, and wherein an entirety of the second component is the second color.

4. The syringe of claim 3, wherein the first color and the second color are contrasting.

5. The syringe of claim 4, wherein the first color and the second color are contrasting from other portions of the syringe.

6. The syringe of claim 1, wherein the first color and the second color are contrasting.

7. The syringe of claim 6, wherein the first color and the second color are contrasting from other portions of the syringe.

8. The syringe of claim 1, wherein one of the first color and the second color is orange.

9. The syringe of claim 8, wherein the other of the first color or the second color is blue.

10. The syringe of claim 1, wherein the barrel is transparent.

11. The syringe of claim 10, wherein the first component is disposed at least partially within the fluid chamber, and wherein the second component is disposed at a forward end of, a rearward end of, or longitudinally along an outside of the barrel.

* * * * *